United States Patent
Chang et al.

(10) Patent No.: US 11,025,947 B2
(45) Date of Patent: Jun. 1, 2021

(54) METHOD AND APPARATUS FOR GENERATING MOTION FIELD MOTION VECTORS FOR BLOCKS OF CURRENT FRAME IN ON-THE-FLY MANNER

(71) Applicant: MEDIATEK INC., Hsin-Chu (TW)

(72) Inventors: Yung-Chang Chang, Hsinchu (TW); Chia-Yun Cheng, Hsinchu (TW); Cheng-Han Li, Hsinchu (TW); Hong-Cheng Lin, Hsinchu (TW); Chi-Hung Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/697,119

(22) Filed: Nov. 26, 2019

(65) Prior Publication Data

US 2020/0177909 A1     Jun. 4, 2020

Related U.S. Application Data

(60) Provisional application No. 62/772,701, filed on Nov. 29, 2018.

(51) Int. Cl.
*H04N 19/52* (2014.01)
*H04N 19/119* (2014.01)
*H04N 19/176* (2014.01)

(52) U.S. Cl.
CPC ........... *H04N 19/52* (2014.11); *H04N 19/119* (2014.11); *H04N 19/176* (2014.11)

(58) Field of Classification Search
CPC .. H04N 19/119; H04N 19/129; H04N 19/139; H04N 19/176; H04N 19/433; H04N 19/513; H04N 19/52; H04N 19/573
See application file for complete search history.

(56) References Cited

U.S. PATENT DOCUMENTS

| | | | | |
|---|---|---|---|---|
| 2010/0284627 | A1* | 11/2010 | Lin | H04N 5/145 382/275 |
| 2011/0058612 | A1* | 3/2011 | Yoshikawa | H04N 19/43 375/240.16 |
| 2020/0213608 | A1* | 7/2020 | Chen | H04N 19/176 |

* cited by examiner

*Primary Examiner* — Md N Haque
(74) *Attorney, Agent, or Firm* — Winston Hsu

(57) ABSTRACT

A motion vector (MV) projection method includes generating motion field motion vectors (MFMVs) for a first portion of a current frame by applying MV projection to MVs of a portion of each of reference frames and storing the MFMVs of the first portion of the current frame into an MFMV buffer, and generating MFMVs for a second portion of the current frame by applying MV projection to MVs of a portion of each of the reference frames and storing the MFMVs of the second portion of the current frame into the MFMV buffer. The second portion does not overlap the first portion. Before generating the MFMVs for the second portion of the current frame is done, at least one of the MFMVs of the first portion is read from the MFMV buffer and involved in motion vector determination of at least one coding block included in the first portion.

10 Claims, 16 Drawing Sheets

SB=64X64

SB=128X128

METHOD AND APPARATUS FOR GENERATING MOTION FIELD MOTION VECTORS FOR BLOCKS OF CURRENT FRAME IN ON-THE-FLY MANNER

CROSS REFERENCE TO RELATED APPLICATIONS

This application claims the benefit of U.S. provisional application No. 62/772,701, filed Nov. 29, 2018 on and incorporated herein by reference.

BACKGROUND

The present invention relates to video coding, and more particularly, to a method and an apparatus for generating motion field motion vectors for blocks of a current frame in an on-the-fly manner.

The conventional video coding standards generally adopt a block based coding technique to exploit spatial and temporal redundancy. For example, the basic approach is to divide a source frame into a plurality of blocks, perform prediction on each block, transform residuals of each block, and perform quantization, scan and entropy encoding. Besides, a reconstructed frame is generated in an internal decoding loop of a video encoder to provide reference pixel data used for coding following blocks. For example, inverse scan, inverse quantization, and inverse transform may be included in the internal decoding loop of the video encoder to recover residuals of each block that will be added to predicted samples of each block for generating a reconstructed frame. The functions of the internal decoding loop of the video encoder are also implemented in a video decoder for recovering residuals of each block and generating a reconstructed frame.

Motion estimation is a core part of inter prediction in modern video coding standards, which highly improves the compression efficiency. On the other hand, motion information takes considerable portion of compressed bit stream, especially in a low bit rate situation. To minimize the number of bits required to represent motion vector (MV) information, usually, a motion vector predictor (MVP) is used and then the motion vector difference (MVD) which is the difference between an MV and the MVP is encoded into the bitstream. Moreover, the MVP is also utilized as the starting point for motion estimation. Based on the MV (MV=MVP+MVD), motion compensation obtains a predicted block that can be used to reconstruct a block. In video sequences, the motions of blocks have high correlation both in spatial and temporal domains. Hence, an MVP candidate set including several spatial and temporal predictors can be built, such that a final MVP of a block can be determined on the basis of the MVP candidate set. If the MVP accuracy can be increased, the MVD can be reduced and the coding efficiency can be improved. For example, to increase the MVP accuracy, each temporal predictor included in the MVP candidate set may be set by a motion field motion vector (MFMV) derived from MV projection. One conventional design employs an off-line method to traverse all 64×64 blocks of reference frames and prepare MFMVs for all blocks of a current frame (which is a frame to be encoded/decoded) in an MFMV buffer before motion vector determination of any block of the current frame is started. In other words, regarding encoding/decoding of the current frame, a post-processing stage (e.g., motion vector determination) must wait for an end of a pre-processing stage (e.g., motion vector projection), thus resulting in degradation of the encoding/decoding performance.

SUMMARY

One of the objectives of the claimed invention is to provide a method and an apparatus for generating motion field motion vectors for blocks of a current frame in an on-the-fly manner.

According to a first aspect of the present invention, an exemplary motion vector (MV) projection method is disclosed. The exemplary MV projection method includes: generating motion field motion vectors (MFMVs) for a first portion of a current frame by applying MV projection to MVs of a portion of each of reference frames, and storing the MFMVs of the first portion of the current frame into an MFMV buffer; and generating MFMVs for a second portion of the current frame by applying MV projection to MVs of a portion of each of the reference frames, and storing the MFMVs of the second portion of the current frame into the MFMV buffer. The second portion of the current frame does not overlap the first portion of the current frame. Before generating the MFMVs for the second portion of the current frame is done, at least one of the MFMVs of the first portion of the current frame is read from the MFMV buffer and involved in motion vector determination of at least one coding block included in the first portion of the current frame.

According to a second aspect of the present invention, an exemplary motion vector (MV) projection apparatus is disclosed. The exemplary MV projection apparatus includes a motion field motion vector (MFMV) buffer and a processing circuit. The processing circuit is arranged to generate MFMVs for a first portion of a current frame by applying MV projection to MVs of a portion of each of reference frames, and store the MFMVs of the first portion of the current frame into the MFMV buffer; and generate MFMVs for a second portion of the current frame by applying MV projection to MVs of a portion of each of the reference frames, and store the MFMVs of the second portion of the current frame into the MFMV buffer. The second portion of the current frame does not overlap the first portion of the current frame. Before the MFMVs for the second portion of the current frame are generated by the processing circuit, at least one of the MFMVs of the first portion of the current frame is read from the MFMV buffer and involved in motion vector determination of at least one coding block included in the first portion of the current frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
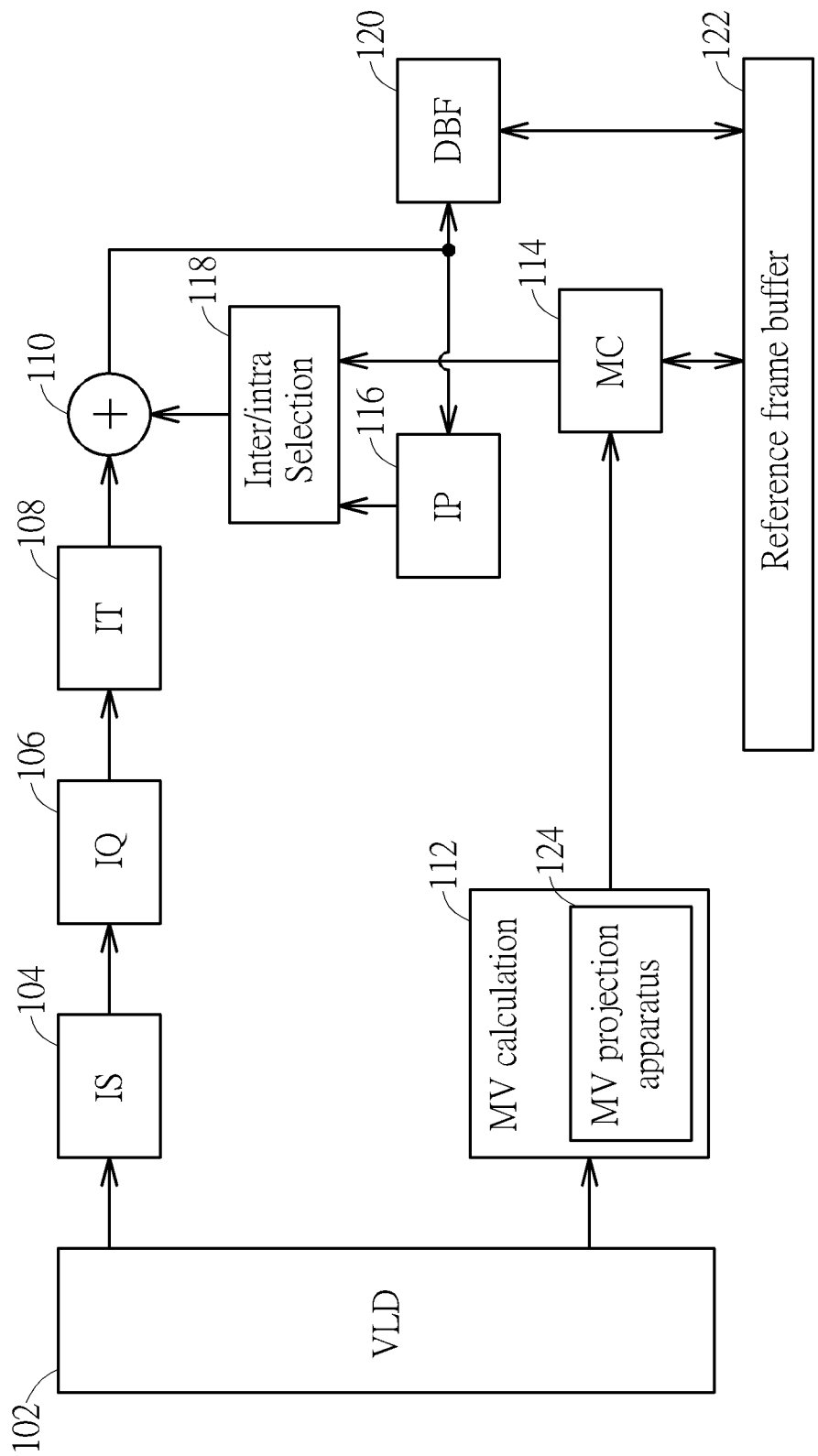
FIG. 1 is a diagram illustrating a video decoder according to an embodiment of the present invention.

FIG. 1 is a diagram illustrating a video decoder according to an embodiment of the present invention. The video decoder 100 may be an AV1 video decoder. However, this is for illustrative purposes only, and is not meant to be a limitation of the present invention. Any video decoder using the proposed on-the-fly method to generate motion field motion vectors for blocks of a current frame to be decoded falls within the scope of the present invention. As shown in FIG. 1, the video decoder 100 includes an entropy decoding circuit (e.g., a variable length decoder (VLD) 102), an inverse scan circuit (denoted by "IS") 104, an inverse quantization circuit (denoted by "IQ") 106, an inverse transform circuit (denoted by "IT") 106, a reconstruction circuit 110, a motion vector calculation circuit (denoted by "MV calculation") 112, a motion compensation circuit (denoted by "MC") 114, an intra-prediction circuit (denoted by "IP") 116, an inter/intra mode selection circuit (denoted by "Inter/intra selection") 118, an in-loop filter (e.g., deblocking filter (DBF) 120), and a reference frame buffer 122. When a block is encoded by an intra-prediction mode, the intra-prediction circuit 116 is used to determine an intra predicted block, and the reconstruction circuit 110 generates a reconstructed block according to the intra predicted block output from the inter/intra mode selection circuit 118 and residue output from the inverse transform circuit 108. When a block is encoded by an inter-prediction mode, the motion vector calculation circuit 112 and the motion compensation circuit 110 are used to determine an inter predicted block, and the reconstruction circuit 110 generates a reconstructed block according to the inter predicted block output from the inter/intra mode selection circuit 118 and residue output from the inverse transform circuit 108. In addition, a reconstructed frame generated from the reconstruction circuit 110 undergoes in-loop filtering before the reconstructed frame is stored into the reference fame buffer 122 to serve as a reference frame. Since a person skilled in the pertinent art can readily understand details of VLD 102, inverse scan circuit 104, inverse quantization circuit 106, inverse transform circuit 108, reconstruction circuit 110, intra-prediction circuit 116, motion compensation circuit 114, inter/intra mode selection circuit 118, DBF 120, and reference frame buffer 122, further description is omitted here for brevity.

The motion vector difference (MVD) for a current coding block is decoded from the VLD 102, and the motion vector predictor (MVP) of the current coding block is determined at the motion vector calculation circuit 112. Hence, the motion vector calculation circuit 112 calculates the motion vector (MV) of the current coding block according to the decoded MVD and the calculated MVP, where MV=MVP+MVD. In this embodiment, the motion vector calculation circuit 112 builds an MVP candidate set including several spatial and temporal predictors, and determines a final MVP of the current coding block according to the MVP candidate set, where each temporal predictor included in the MVP candidate set may be set by a motion field motion vector (MFMV) derived from MV projection. In this embodiment, the motion vector calculation circuit 112 includes an MV projection apparatus 124 that is arranged to generate MFMVs for blocks of a current frame in an on-the-fly manner. In accordance with the proposed on-the-fly motion vector projection scheme, a post-processing stage (e.g., motion vector determination) does not need to wait for an end of a pre-processing stage (e.g., motion vector projection), thus reducing the processing time of decoding and increasing the efficiency of hardware.

Figure 2:
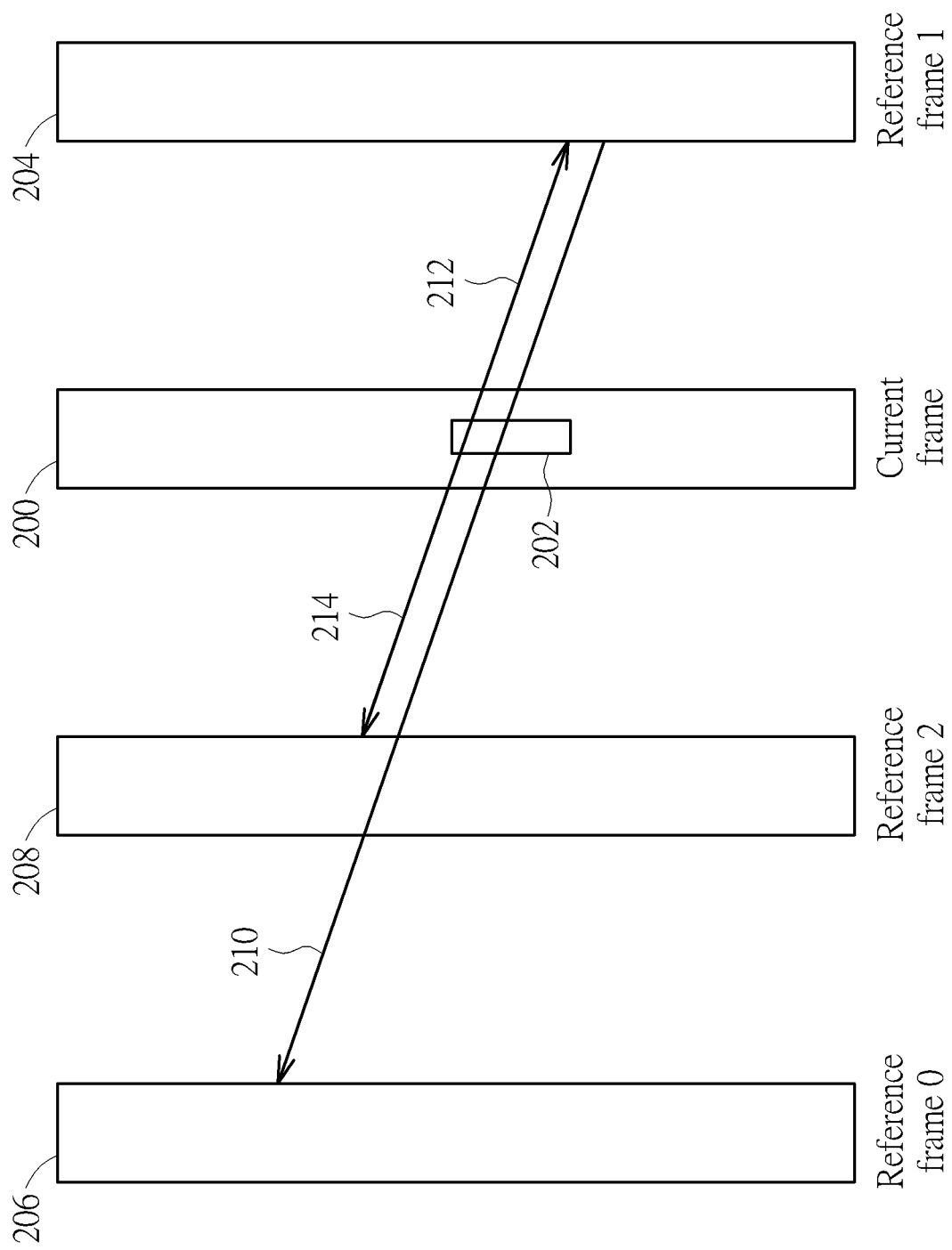
FIG. 2 is a diagram illustrating an example of using a motion trajectory for a current frame to predict motion of a current block included in the current frame.

FIG. 2 is a diagram illustrating an example of using a motion trajectory for a current frame 200 to predict motion of a current block 202 included in the current frame 200. The motion trajectory shows motion between the current frame 200 and three reference frames (also denoted by "Reference frame 1", "Reference frame 0", and "Reference frame 2") 204, 206, and 208. The motion trajectory is determined based on a reference motion vector 210, which indicates motion between the reference frame 206 and the reference frame 204. For example, the reference frame 206 may be a reference frame used to predict motion of one or more blocks of the reference frame 204. After the reference motion vector 210 is determined, the motion trajectory is determined as the trajectory corresponding to the direction of the reference motion vector 210.

The motion trajectory identifies the current block 202 as the location of the current frame 200 intersected by the motion trajectory. A first temporal motion vector candidate 212 may then be determined as indicating motion between the reference frame 204 and the current frame 200. A second temporal motion vector candidate 214 may be determined as indicating motion between the reference frame 208 and the current frame 200. One or more of the reference motion vector 210, the first temporal motion vector candidate 212, and the second temporal motion vector candidate 214 may be included in a MVP candidate set from which a final MVP is selected for actually predicting motion of the current block 202.

In accordance with a display order, the reference frames 206 and 208 are shown as past frames (which may be previously decoded frames) with respect to the current frame 200, and the reference frame 204 is shown as a future frame (which may be a previously decoded frame) with respect to the current frame 200. However, other numbers of past or future reference frames may be used. For example, a motion trajectory can be determined where there is one past reference frame and one future reference frame. In another example, a motion trajectory can be determined where there is one past frame and two future reference frames. In another example, a motion trajectory can be determined where there are two or more past reference frames and two or more future reference frames.

Figure 3:
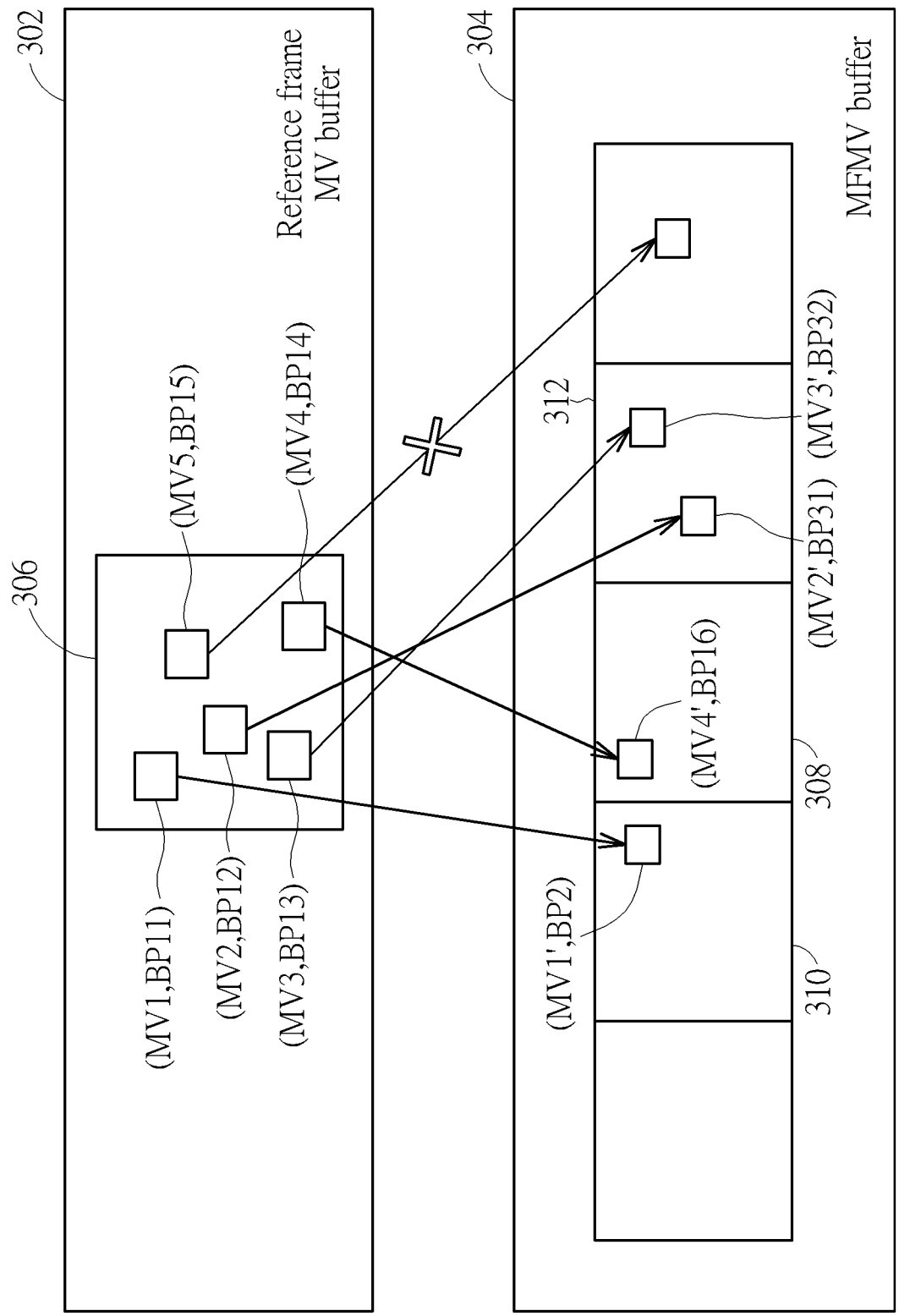
FIG. 3 is a diagram illustrating an example of using motion vector projection to generate motion field motion vectors for blocks included in a current frame.

FIG. 3 is a diagram illustrating an example of using motion vector projection to generate MFMVs for blocks included in a current frame. MVs of all 64×64 blocks included in a reference frame are stored in a reference frame MV buffer 302, where each 64×64 block is divided into a plurality of 8×8 blocks, and an MV of each 8×8 block is recorded in the reference frame MV buffer 302. An MFMV buffer 304 is used to store MV projection results derived from applying MV projection to MVs of 64×64 blocks included in the reference frame. For example, a storage area 308 allocated in the MFMV buffer 304 is used to store MFMVs for a first 64×64 block in a current frame (e.g., projected MVs at 8×8 block positions included in a current 64×64 block of the current frame), where the stored MFMVs may serve as temporal predictors involved in MVP determination and following MV determination; a storage area 310 allocated in the MFMV buffer 304 is used to store MFMVs for a second 64×64 block in the current frame (e.g., projected MVs at 8×8 block positions included in a left neighbor of the current 64×64 block of the current frame), where the stored MFMVs may serve as temporal predictors involved in MVP determination and following MV determination; and a storage area 312 allocated in the MFMV buffer 304 is used to store MFMVs for a third 64×64 block in the current frame (e.g., projected MVs at 8×8 block positions included in a right neighbor of the current 64×64 block of the current frame), where the stored MFMVs may serve as temporal predictors involved in MVP determination and following MV determination.

As shown in FIG. 3, a storage area 306 is allocated in the reference frame MV buffer 302 for storing MVs of a 64×64 reference block (particularly, MVs of all 8×8 blocks included in the 64×64 reference block) in the reference frame, where the 64×64 reference block in the reference frame and the first 64×64 block in the current frame are co-located blocks. To increase the accuracy of MVP determination, the original MVs of the 64×64 reference block are pre-processed by MV projection to generate MFMVs (which are projected MVs) for 64×64 blocks in the current frame, where the MFMVs may serve as temporal predictors later used by MVP determination. In this example, an original motion vector MV1 at a block position BP11 of an 8×8 reference block included in the first 64×64 reference block is projected to the current frame, thus resulting in a projected motion vector MV1' at a projected block position BP2 of a 8×8 block included in the second 64×64 block of the current frame. Hence, the projected motion vector MV1' is stored in a corresponding address in the storage area 310 according to the projected block position BP2.

An original motion vector MV2 at a block position BP12 of an 8×8 reference block included in the 64×64 reference block is projected to the current frame, thus resulting in a projected motion vector MV2' at a projected block position BP31 of a 8×8 block included in the third 64×64 block of the current frame. Hence, the projected motion vector MV2' is stored in a corresponding address in the storage area 308 according to the projected block position BP31.

An original motion vector MV3 at a block position BP13 of an 8×8 reference block included in the 64×64 reference block is projected to the current frame, thus resulting in a projected motion vector MV3' at a projected block position BP32 of an 8×8 block in the third 64×64 block of the current frame. Hence, the projected motion vector MV3' is stored in a corresponding address of the storage area 312 according to the projected block position BP32.

An original motion vector MV4 at a block position BP14 of an 8×8 reference block in the 64×64 reference block is projected to the current frame, thus resulting in a projected motion vector MV4' at a projected block position BP16 of an 8×8 block in the first 64×64 block of the current frame. Hence, the projected motion vector MV4' is stored in a corresponding address in the storage area 308 according to the projected block position BP16.

The projected 8×8 block position should be within a valid range. As mentioned above, the first 64×64 block in the current frame and the 64×64 reference block in the reference frame are co-located blocks, the second 64×64 block in the current frame is a left neighbor of the first 64×64 block in the current frame, and the third 64×64 block in the current frame is a right neighbor of the first 64×64 block in the current frame. When MV projection is applied to MVs possessed by 8×8 reference blocks of the 64×64 reference block in the reference frame, the valid range is defined by the first 64×64 block, the second 64×64 block, and the third 64×64 block. Hence, a projected position is valid when the projected position is within any of the first 64×64 block, the second 64×64 block, and the third 64×64 block, and a projected position is invalid when the projected position is within a 64×64 block that is not one of the first 64×64 block, the second 64×64 block, and the third 64×64 block. As shown in FIG. 3, an original motion vector MV5 at a block position BP15 of an 8×8 reference block in the 64×64 reference block is projected to the current frame, thus resulting in a projected motion vector at an invalid projected block position outside of the valid range. Hence, the projected motion vector with the invalid projected block position is blocked from being stored into the MFMV buffer 304.

In a case where the second 64×64 block (e.g., a left neighbor of the first 64×64 block) is not available in the current frame when MV projection is applied to MVs possessed by 8×8 reference blocks of the 64×64 reference block in the reference frame, the valid range is defined by the first 64×64 block and the third 64×64 block (e.g., a right neighbor of the first 64×64 block). Hence, a projected position is valid when the projected position is within any of the first 64×64 block and the third 64×64 block, and a projected position is invalid when the projected position is within a 64×64 block that is not one of the first 64×64 block and the third 64×64 block.

In another case where the third 64×64 block (e.g., a right neighbor of the first 64×64 block) is not available in the current frame when MV projection is applied to MVs possessed by 8×8 reference blocks of the 64×64 reference block in the reference frame, the valid range is defined by the first 64×64 block and the second 64×64 block (e.g., a left neighbor of the first 64×64 block). Hence, a projected position is valid when the projected position is within any of the first 64×64 block and the second 64×64 block, and a projected position is invalid when the projected position is within a 64×64 block that is not one of the first 64×64 block and the second 64×64 block.

The MV projection apparatus 124 is arranged to generate projected MVs (a.k.a. MFMVs) for blocks of a current frame in an on-the-fly manner, where the projected MVs may be later read from the MFMV buffer 304 and serve as temporal predictors used in MVP determination of the blocks of the current frame before MV projection of the whole reference frame is done.

Figure 4:
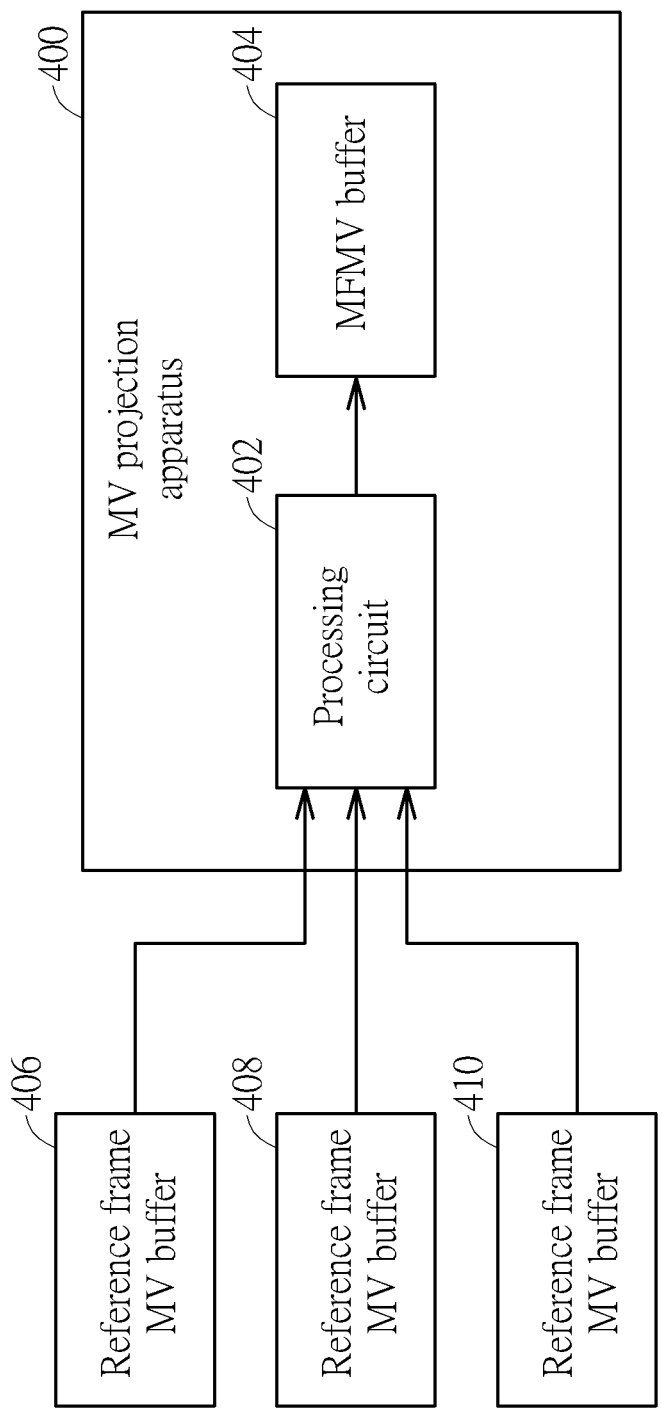
FIG. 4 is a diagram illustrating a motion vector projection apparatus according to an embodiment of the present invention.

FIG. 4 is a diagram illustrating an MV projection apparatus according to an embodiment of the present invention. The MV projection apparatus 124 shown in FIG. 1 may be implemented using the MV projection apparatus 400 shown in FIG. 4. The MV projection apparatus 400 includes a processing circuit 402 and an MFMV buffer 404. For example, the processing circuit 402 may be implemented by a processor, and the MFMV buffer 404 may be implemented by a static random access memory (SRAM) with one or more storage spaces allocated therein. In some embodiments of the present invention, the MFMV buffer 404 shown in FIG. 4 may act as the MFMV buffer 304 shown in FIG. 3.

The processing circuit 402 is arranged to generate MFMVs for a first portion of a current frame by applying MV projection to MVs of a portion of each of reference frames, and store the MFMVs of the first portion of the current frame into the MFMV buffer 404; and is further arranged to generate MFMVs for a second portion of the current frame by applying MV projection to MVs of a portion of each of the reference frames, and storing the MFMVs of the second portion of the current frame into the MFMV buffer 404. The second portion of the current frame does not overlap the first portion of the current frame. Before the MFMVs for the second portion of the current frame are generated by the processing circuit 402, at least one of the MFMVs of the first portion of the current frame is read from the MFMV buffer 404 and involved in motion vector determination of at least one coding block included in the first portion of the current frame. For example, MVs of three reference frames are processed by MV projection to generate MFMVs for the current frame. Hence, MVs of 64×64 blocks included in a first reference frame Ref1 (e.g., reference frame 206 shown in FIG. 2) are stored in the reference frame MV buffer 406, MVs of 64×64 blocks included in a second reference frame Ref2 (e.g., reference frame 204 shown in FIG. 2) are stored in the reference frame MV buffer 408, and MVs of 64×64 blocks included in a third reference frame Ref3 (e.g., reference frame 208 shown in FIG. 2) are stored in the reference frame MV buffer 410.

Figure 5:
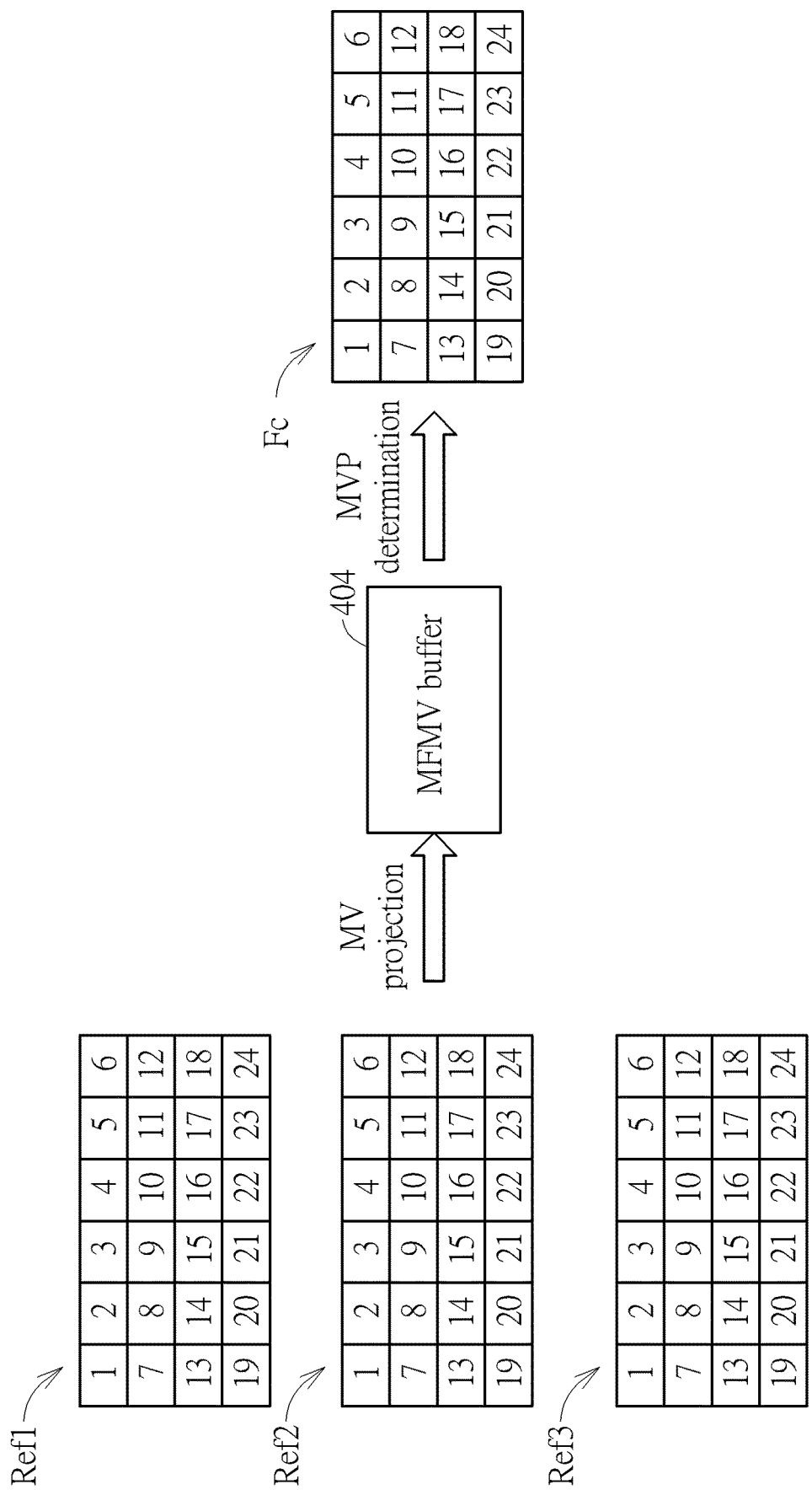
FIG. 5 is a diagram illustrating the same motion field motion vector buffer accessed by a preceding motion vector projection operation and a following motion vector predictor determination according to an embodiment of the present invention.

All 64×64 blocks in a reference frame will be accessed for MV projection. Suppose that a super block (SB) size is 64×64. FIG. 5 is a diagram illustrating the same MFMV buffer 404 accessed by a preceding MV projection operation and a following MVP determination according to an embodiment of the present invention. As shown in FIG. 5, the first reference frame Ref1 is divided into a plurality of 64×64 blocks indexed by, for example, the reference numerals "1", "2", . . . , "24"; the second reference frame Ref2 is divided into a plurality of 64×64 blocks indexed by, for example, the reference numerals "1", "2", . . . , "24"; the third reference frame Ref3 is divided into a plurality of 64×64 blocks indexed by, for example, the reference numerals "1", "2", . . . , "24"; and the current frame Fc is divided into a plurality of 64×64 blocks indexed by, for example, the reference numerals "1", "2", . . . , "24". The 64×64 blocks indexed by the same reference numeral are co-located blocks. Regarding MV projection applied to the first reference frame Ref1, the 64×64 blocks are traversed in a raster scan order as illustrated by reference numerals in an ascending order 1→2→3→4→ . . . →23→24. Regarding MV projection applied to the second reference frame Ref2, the 64×64 blocks are traversed in a raster scan order as illustrated by reference numerals in an ascending order 1→2→3→4→ . . . →23→24. Regarding MV projection applied to the third reference frame Ref3, the 64×64 blocks are traversed in a raster scan order as illustrated by reference numerals in an ascending order 1→2→3→4→ . . . →23→24. The conventional off-line method applies frame-level MV projection to the reference frames, such that MV projection of the second reference frame Ref2 is started after MV projection of the whole first reference frame Ref1 is done, and MV projection of the third reference frame Ref3 is started after MV projection of the whole second reference frame Ref2 is done. In addition, MFMVs in an MFMV buffer for a current frame are available to a post-processing stage (e.g., MVP determination) after MV projection of all reference frames is done. In contrast to the conventional off-line method which performs MV projection at a frame level, the proposed on-the-fly method performs MV projection at a block level (more particularly, 64×64 block level). Hence, MFMVs available in the MFMV buffer 404 for the current frame Fc can be used by a post-processing stage (e.g., MVP determination) before MV projection of all reference frames is done. For example, before MFMVs for the 64×64 block indexed by "24" (i.e., a last 64×64 block located at a right-most block column and a bottom-most block row of the current frame Fc) in the current frame Fc are generated by MV projection applied to MVs possessed by 64×64 reference blocks indexed by "23" and "24", at least one of MFMVs available for a preceding 64×64 block in the current frame is read from the MFMV buffer 404 and involved in motion vector determination (i.e., MV=MVP+MVD) of at least one coding block included in the preceding 64×64 block of the current frame Fc. Further details of the proposed on-the-fly method are described with reference to the accompanying drawings.

Figure 6:
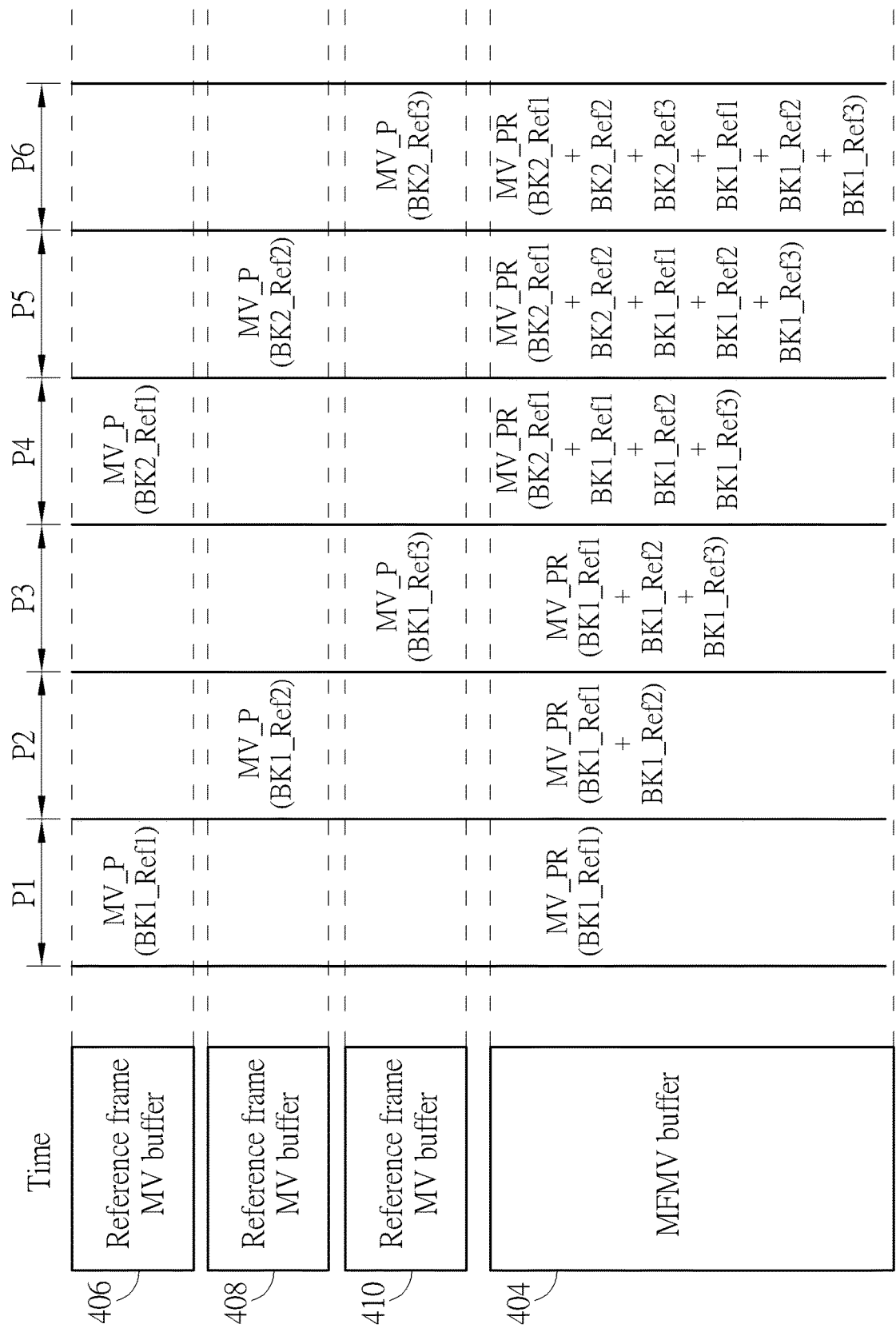
FIG. 6 is a diagram illustrating a first motion vector projection operation performed by a processing circuit in an on-the-fly manner according to an embodiment of the present invention.

FIG. 6 is a diagram illustrating a first motion vector projection operation performed by the processing circuit 402 in an on-the-fly manner according to an embodiment of the present invention. During a processing period P1, the processing circuit 402 applies MV projection to MVs possessed by a first 64×64 reference block in the first reference frame Ref1 (denoted by "MV_P (BK1_Ref1)") to generate an MV projection result, and updates the MFMV buffer 404 by the MV projection result (denoted by "MV_PR (BK1_Ref1)"). During a processing period P2, the processing circuit 402 applies MV projection to MVs possessed by a first 64×64 reference block in the second reference frame Ref2 (denoted by "MV_P (BK1_Ref2)") to generate an MV projection result, and updates the MFMV buffer 404 by a combined MV projection result (denoted by "MV_PR (BK1_Ref1+ BK1_Ref2)"), where the latest projected results will overlap/overwrite the previous results when the projected 8×8 block positions of the latest projected results are equal to the projected 8×8 block positions of the previous results. During a processing period P3, the processing circuit 402 applies MV projection to MVs possessed by a first 64×64 reference block in the third reference frame Ref3 (denoted by "MV_P (BK1_Ref3)") to generate an MV projection result, and updates the MFMV buffer 404 by a combined MV projection result (denoted by "MV_PR (BK1_Ref1+BK1_Ref2+ BK1_Ref3)"), where the latest projected results will overlap/overwrite the previous results when the projected 8×8 block positions of the latest projected results are equal to the projected 8×8 block positions of the previous results. The first 64×64 reference block in the first reference frame Ref1, the first 64×64 reference block in the second reference frame Ref2, and the first 64×64 reference block in the third reference frame Ref3 are co-located blocks. After MV projection of all co-located first 64×64 reference blocks in reference frames Ref1, Ref2, Ref3 is done, the MFMV buffer 404 includes MFMVs that can act as temporal predictors for MVP determination of coding blocks included in one 64×64 block in the current frame Fc. Hence, at least one MFMV can be read from the MFMV buffer 404 and involved in motion vector determination of at least one coding block included in the first 64×64 block of the current frame Fc while MV projection is still on going for determining MFMVs for the rest of 64×64 blocks in the current frame Fc.

After MV projection of all co-located first 64×64 reference blocks in reference frames Ref1, Ref2, Ref3 is done, the processing circuit 402 starts another projection cycle to deal with MV projection of next 64×64 reference blocks co-located in reference frames Ref1, Ref2, Ref3. The first 64×64 reference block and the second 64×64 reference block in the same reference frame are successive blocks in a raster scan order. For example, the first 64×64 reference block and the second 64×64 reference block may be located at a same block row, and the second 64×64 reference block is a right neighbor of the first 64×64 reference block. During a processing period P4, the processing circuit 402 applies MV projection to MVs possessed by a second 64×64 reference block in the first reference frame Ref1 (denoted by "MV_P (BK2_Ref1)") to generate an MV projection result, and updates the MFMV buffer 404 by a combined MV projection result (denoted by "MV_PR (BK2_Ref1+ BK1_Ref1+BK1_Ref2+BK1_Ref3)"), where the latest projected results will overlap/overwrite the previous results when the projected 8×8 block positions of the latest projected results are equal to the projected block positions of the previous results. During a processing period P5, the processing circuit 402 applies MV projection to MVs possessed by a second 64×64 reference block in the second reference frame Ref2 (denoted by "MV_P (BK2_Ref2)") to generate an MV projection result, and updates the MFMV buffer 404 by a combined MV projection result (denoted by "MV_PR (BK2_Ref1+BK2_Ref2+BK1_Ref1+BK1_Ref2+ BK1_Ref3)"), where the latest projected results will overlap/overwrite the previous results when the projected 8×8 block positions of the latest projected results are equal to the projected 8×8 block positions of the previous results. During a processing period P6, the processing circuit 402 applies MV projection to MVs possessed by a second 64×64 reference block in the third reference frame Ref3 (denoted by "MV_P (BK2_Ref3)") to generate an MV projection result, and updates the MFMV buffer 404 by a combined MV projection result (denoted by "MV_PR (BK2_Ref1+ BK2_Ref2+BK2_Ref3+BK1_Ref1+BK1_Ref2+ BK1_Ref3)"), where the latest projected results will overlap/overwrite the previous results when the projected 8×8 block positions of the latest projected results are equal to the projected 8×8 block positions of the previous results. The second 64×64 reference block in the first reference frame Ref1, the second 64×64 reference block in the second reference frame Ref2, and the second 64×64 reference block in the third reference frame Ref3 are co-located blocks. After MV projection of all co-located second 64×64 reference blocks in reference frames Ref1, Ref2, Ref3 is done, the combined MV projection result (denoted by "MV_PR (BK2_Ref1+BK2_Ref2+BK2_Ref3+BK1_Ref1+ BK1_Ref2+BK1_Ref3)") is available in the MFMV buffer 404, and includes MFMVs that can act as temporal predictors for MVP determination of coding blocks included in one 64×64 block of the current frame Fc. Hence, at least one MFMV can be read from the MFMV buffer 404 and involved in motion vector determination of at least one coding block included in one 64×64 block of the current frame Fc while MV projection is still on going for determining MFMVs for the rest of 64×64 blocks in the current frame Fc.

In the embodiment shown in FIG. 6, the processing circuit 402 applies MV projection to a single 64×64 block in another reference frame each time MV projection of a single 64×64 block in one reference frame is done. However, this is for illustrative purposes only, and is not meant to be a limitation of the present invention. Alternatively, the processing circuit 402 may apply MV projection to successive 64×64 blocks in another reference frame each time MV projection of successive 64×64 blocks in one reference frame is done, where the number of successive 64×64 blocks is a positive integer not smaller than 2.

Figure 7:
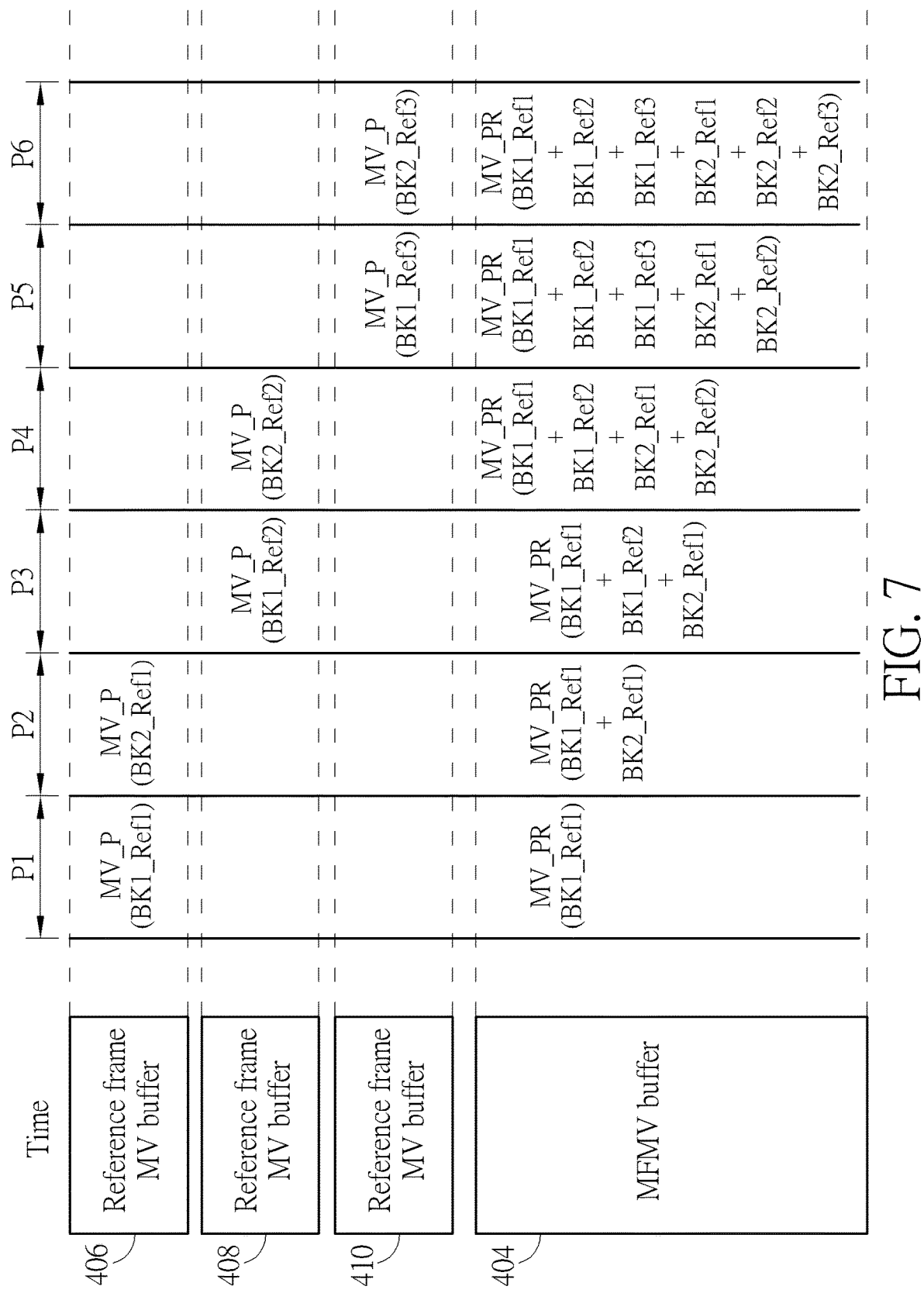
FIG. 7 is a diagram illustrating a second motion vector projection operation performed by a processing circuit in an on-the-fly manner according to an embodiment of the present invention.

FIG. 7 is a diagram illustrating a second motion vector projection operation performed by the processing circuit 402 in an on-the-fly manner according to an embodiment of the present invention. During a processing period P1, the processing circuit 402 applies MV projection to MVs possessed by a first 64×64 reference block in the first reference frame Ref1 (denoted by "MV_P (BK1_Ref1)") to generate an MV projection result, and updates the MFMV buffer 404 by the MV projection result (denoted by "MV_PR (BK1_Ref1)"). During a processing period P2, the processing circuit 402 applies MV projection to MVs possessed by a second 64×64 reference block in the first reference frame Ref1 (denoted by "MV_P (BK2_Ref1)") to generate an MV projection result, and updates the MFMV buffer 404 by a combined MV projection result (denoted by "MV_PR (BK1_Ref1+ BK2_Ref1)"). The first 64×64 reference block and the second 64×64 reference block in the first reference frame Ref1 are successive blocks in a raster scan order. For example, the first 64×64 reference block and the second 64×64 reference block may be located at a same block row of the first reference frame Ref1, and the second 64×64 reference block is a right neighbor of the first 64×64 reference block.

During a processing period P3, the processing circuit 402 applies MV projection to MVs possessed by a first 64×64 reference block in the second reference frame Ref2 (denoted by "MV_P (BK1_Ref2)") to generate an MV projection result, and updates the MFMV buffer 404 by a combined MV projection result (denoted by "MV_PR (BK1_Ref1+BK1_Ref2+BK2_REF1)"), where the latest projected results will overlap/overwrite the previous results when the projected 8×8 block positions of the latest projected results are equal to the projected 8×8 block positions of the previous results. During a processing period P4, the processing circuit 402 applies MV projection to MVs possessed by a second 64×64 reference block in the second reference frame Ref2 (denoted by "MV_P (BK2_Ref2)") to generate an MV projection result, and updates the MFMV buffer 404 by a combined MV projection result (denoted by "MV_PR (BK1_Ref1+BK1_Ref2+BK2_Ref1+BK2_Ref2)"), where the latest projected results will overlap/overwrite the previous results when the projected 8×8 block positions of the latest projected results are equal to the projected 8×8 block positions of the previous results. The first 64×64 reference block and the second 64×64 reference block in the second reference frame Ref2 are successive blocks in a raster scan order. For example, the first 64×64 reference block and the second 64×64 reference block may be located at a same block row of the second reference frame Ref2, and the second 64×64 reference block is a right neighbor of the first 64×64 reference block.

During a processing period P5, the processing circuit 402 applies MV projection to MVs possessed by a first 64×64 reference block in the third reference frame Ref3 (denoted by "MV_P (BK1_Ref3)") to generate an MV projection result, and updates the MFMV buffer 404 by a combined MV projection result (denoted by "MV_PR (BK1_Ref1+BK1_Ref2+BK1_Ref3+BK2_Ref1+BK2_Ref2)"), where the latest projected results will overlap/overwrite the previous results when the projected 8×8 block positions of the latest projected results are equal to the projected 8×8 block positions of the previous results.

During a processing period P6, the processing circuit 402 applies MV projection to MVs possessed by a second 64×64 reference block in the third reference frame Ref3 (denoted by "MV_P (BK2_Ref3)") to generate an MV projection result, and updates the MFMV buffer 404 by a combined MV projection result (denoted by "MV_PR (BK1_Ref1+BK1_Ref2+BK1_Ref3+BK2_Ref1+BK2_Ref2+BK2_Ref3)"), where the latest projected results will overlap/overwrite the previous results when the projected 8×8 block positions of the latest projected results are equal to the projected 8×8 block positions of the previous results. The first 64×64 reference block and the second 64×64 reference block in the third reference frame Ref3 are successive blocks in a raster scan order. For example, the first 64×64 reference block and the second 64×64 reference block may be located at a same block row of the third reference frame Ref3, and the second 64×64 reference block is a right neighbor of the first 64×64 reference block.

The first 64×64 reference blocks in reference frames Ref1, Ref2, Ref3 are co-located blocks. The second 64×64 reference blocks in reference frames Ref1, Ref2, Ref3 are co-located blocks. After MV projection of all co-located first 64×64 reference blocks in reference frames Ref1, Ref2, Ref3 is done, the MFMV buffer 404 includes MFMVs that can act as temporal predictors for MVP determination of coding blocks included in one 64×64 block of the current frame Fc. Similarly, after MV projection of all co-located second 64×64 reference blocks in reference frames Ref1, Ref2, Ref3 is done, the MFMV buffer 404 includes MFMVs that can act as temporal predictors for MVP determination of coding blocks included in one 64×64 block of the current frame Fc. Hence, at least one MFMV can be read from the MFMV buffer 404 and involved in motion vector determination of at least one coding block included in one 64×64 block of the current frame Fc while MV projection is still on going for determining MFMVs for the rest of 64×64 blocks in the current frame Fc.

Figure 8:
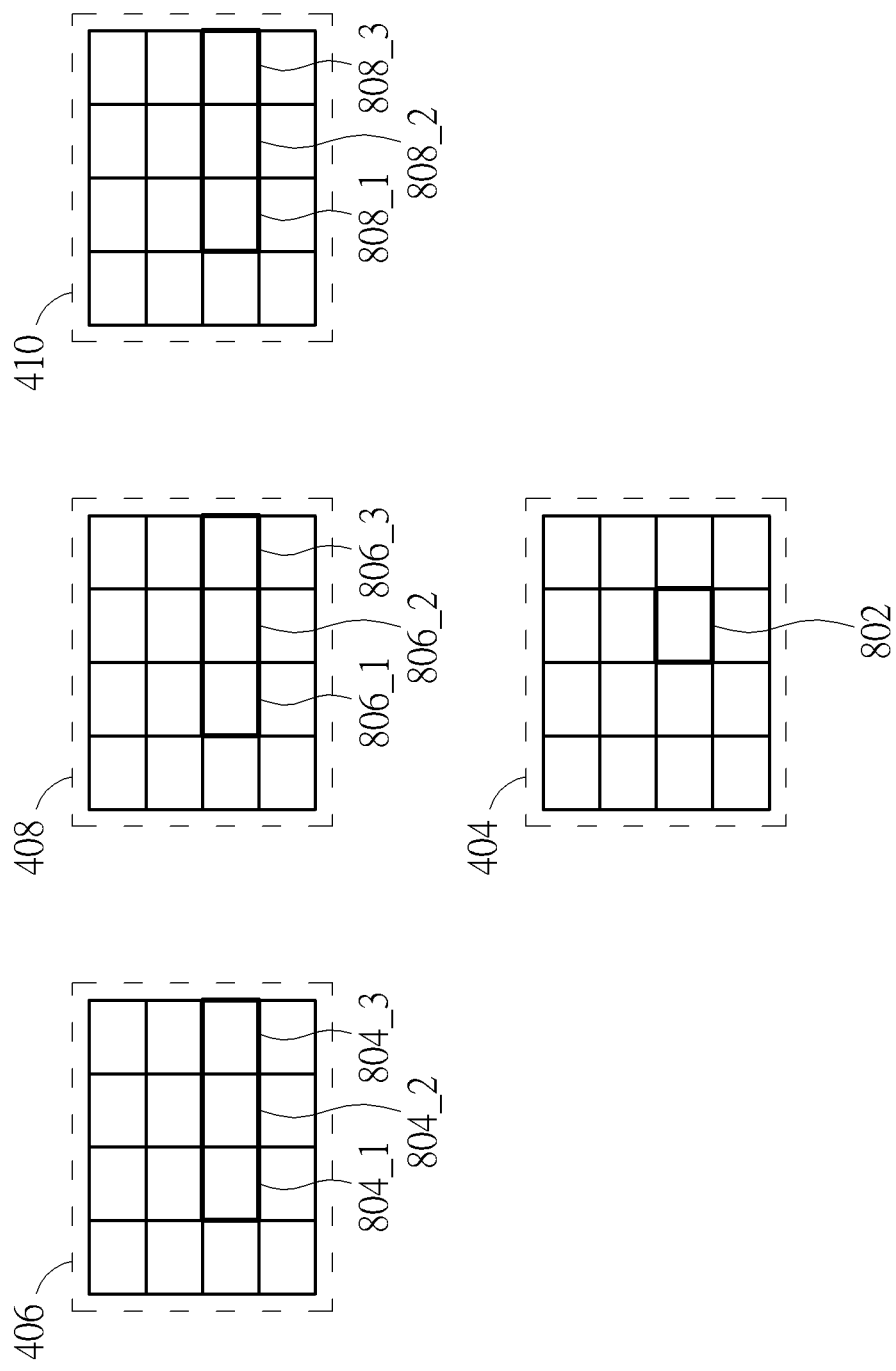
FIG. 8 is a diagram illustrating a third motion vector projection operation performed by a processing circuit in an on-the-fly manner according to an embodiment of the present invention.

FIG. 8 is a diagram illustrating a third motion vector projection operation performed by the processing circuit in an on-the-fly manner according to an embodiment of the present invention. As mentioned above, when MV projection is applied to MVs of a 64×64 reference block in a reference frame, the valid range is defined by a co-located 64×64 block in a current frame, a left neighbor of the co-located 64×64 block in the current frame, and a right neighbor of the co-located 64×64 block in the current frame. In this embodiment, MFMVs for one 64×64 block in the current frame can be obtained in an on-the-fly manner by combining MV projection results derived from possible projection blocks in the reference frames. As shown in FIG. 8, the 64×64 block 802 in the current frame, the 64×64 reference block 804_2 in the first reference frame, the 64×64 reference block 806_2 in the second reference frame, and the 64×64 reference block 808_2 in the third reference frame are co-located blocks. In accordance with a valid range limitation, possible projection blocks for providing MFMVs (projected MVs) at a block position of a target block (e.g., 64×64 block 802) include 64×64 reference blocks 804_1, 804_2, 804_3 in the first reference frame, 64×64 reference blocks 806_1, 806_2, 806_3 in the second reference frame, and 64×64 reference blocks 808_1, 808_2, 808_3 in the third reference frame, where the 64×64 reference blocks 804_1, 806_1, 808_1 in different reference frames and a left neighbor of the 64×64 block 802 in the current frame are co-located blocks, and the 64×64 reference blocks 804_3, 806_3, 808_3 in different reference frames and a right neighbor of the 64×64 block 802 in the current frame are co-located blocks. The processing circuit 402 refers to MVs of 64×64 reference blocks 804_1-804_3, 806_1-806_3, 808_1-808_3 for generating MV projection results at a block position of the 64×64 block 802, and generating MFMVs for the 64×64 block 802 in the current frame according to a combined result derived from the MV projection results at the block position of the 64×64 block 802 in the current frame, where MVs of 64×64 reference blocks 804_1-804_3 in the first reference frame are read from one reference frame MV buffer (e.g., reference frame MV buffer 406), MVs of 64×64 reference blocks 806_1-806_3 in the second reference frame are read from another reference frame MV buffer (e.g., reference frame MV buffer 408), and MVs of 64×64 reference blocks 808_1-808_3 in the third reference frame are read from yet another reference frame MV buffer (e.g., reference frame MV buffer 410). It should be noted that a projected result of an 8×8 block in one of 64×64 reference blocks 806_1-806_3 of the second reference frame will overlap/overwrite a projected result of an 8×8 block in one of 64×64 reference blocks 804_1-804_3 of the first reference frame when the projected 8×8 block positions are the same, a projected result of an 8×8 block in one of 64×64 reference blocks 808_1-808_3 of the third reference frame will overlap/overwrite a projected result of an 8×8 block in one of 64×64 reference blocks 804_1-804_3 of the first reference frame when the projected 8×8 block positions are the same, and a projected result of an 8×8 block in one of 64×64 reference blocks 808_1-808_3 of the third reference frame will overlap/overwrite a projected result of an 8×8 block in one of 64×64 reference blocks 806_1-806_3 of the second reference frame when the projected 8×8 block positions are the same.

To obtain MFMVs for a right neighbor of the 64×64 block 802 in the current frame, the processing circuit 402 that employs the on-the-fly method illustrated in FIG. 8 reads MVs of the 64×64 reference blocks 804_2 and 804_3 of the first reference frame from one reference frame MV buffer (e.g., reference frame MV buffer 406) again, reads MVs of the 64×64 reference blocks 806_2 and 806_3 of the second reference frame from another reference frame MV buffer (e.g., reference frame MV buffer 408) again, and reads MVs of the 64×64 reference blocks 808_2 and 808_3 of the second reference frame from another reference frame MV buffer (e.g., reference frame MV buffer 410) again due to the fact that possible projection blocks for providing MFMVs (projected MVs) at a block position of the right neighbor of the 64×64 block 802 include 64×64 reference blocks 804_2 and 804_3 in the first reference frame, 64×64 reference blocks 806_2 and 806_3 in the second reference frame, and 64×64 reference blocks 808_2 and 808_3 in the third reference frame.

When the MV projection operation is performed at a frame level according to the conventional off-line method, frame-level MV projection is applied to the first reference frame, the second reference frame, and the third reference frame one by one. Hence, a projected result of an 8×8 block in one 64×64 reference block of the second reference frame will overlap/overwrite a projected result of an 8×8 block in one 64×64 reference block of the first reference frame when the projected 8×8 block positions are the same, a projected result of an 8×8 block in one 64×64 reference block of the third reference frame will overlap/overwrite a projected result of an 8×8 block in one 64×64 reference block of the first reference frame when the projected 8×8 block positions are the same, and a projected result of an 8×8 block in one 64×64 reference block of the third reference frame will overlap/overwrite a projected result of an 8×8 block in one 64×64 reference block of the second reference frame when the projected 8×8 block positions are the same. Regarding the embodiments shown in FIGS. 6 and 7, the MV projection operation is performed at a block level rather than a frame level. Hence, 64×64 reference blocks in different reference frames may undergo MV projection in an interleaving manner. Thus, it is possible that wrong overlapping/overwriting might be occurred due to the fact that wrong projected results replace the correct ones.

Figure 9:
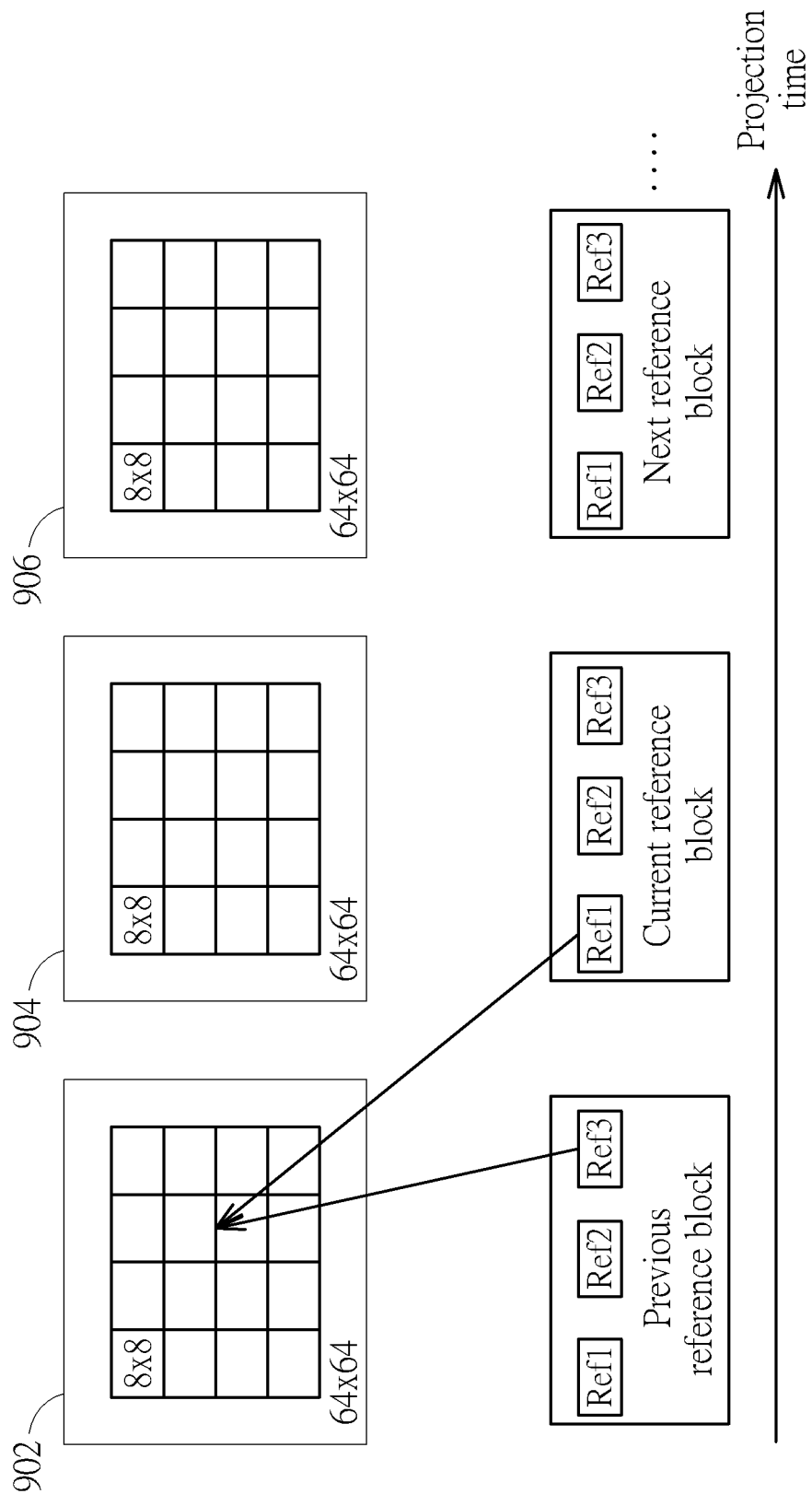
FIG. 9 is a diagram illustrating a possible overlapping/overwriting scenario encountered by the embodiment shown in FIG. 6.

FIG. 9 is a diagram illustrating a possible overlapping/overwriting scenario encountered by the embodiment shown in FIG. 6. As mentioned above, when MV projection is applied to MVs of a 64×64 reference block in a reference frame, the valid range is defined by a co-located 64×64 block in a current frame, a left neighbor of the co-located 64×64 block in the current frame, and a right neighbor of the co-located 64×64 block in the current frame. Hence, when the block-level MV projection is applied to current 64×64 reference blocks co-located in different reference frames, the MFMV buffer 404 has a storage area 902 used for storing MVs projected at 8×8 block positions included in a left neighbor of a current 64×64 block in the current frame, a storage area 904 used for storing MVs projected at 8×8 block positions included in the current 64×64 block of the current frame, and a storage area 902 allocated for storing MVs projected at 8×8 block positions included in a right neighbor of the current 64×64 block in the current frame. The block-level MV projection is applied to current 64×64 reference blocks co-located in different reference frames after the block-level MV projection applied to previous 64×64 reference blocks co-located in different reference frames is done. As shown in FIG. 9, a projection result of MV projection applied to the previous reference block in the third reference frame Ref3 has a first MFMV projected at a 8×8 block position in a left neighbor, and a projection result of MV projection applied to the current reference block in the first reference frame Ref1 has a second MFMV projected at the same 8×8 block position in the left neighbor. Hence, the first MFMV buffered in the storage area 902 is overlapped/overwritten by the second MFMV according to the embodiment of FIG. 6, thus resulting in wrong overlapping/overwriting. To address this issue, the present invention further proposes using a priority table or ensuring that MV projection progress of one reference frame leads that of another reference frame by K 64×64 reference blocks (K≥2).

Figure 10:
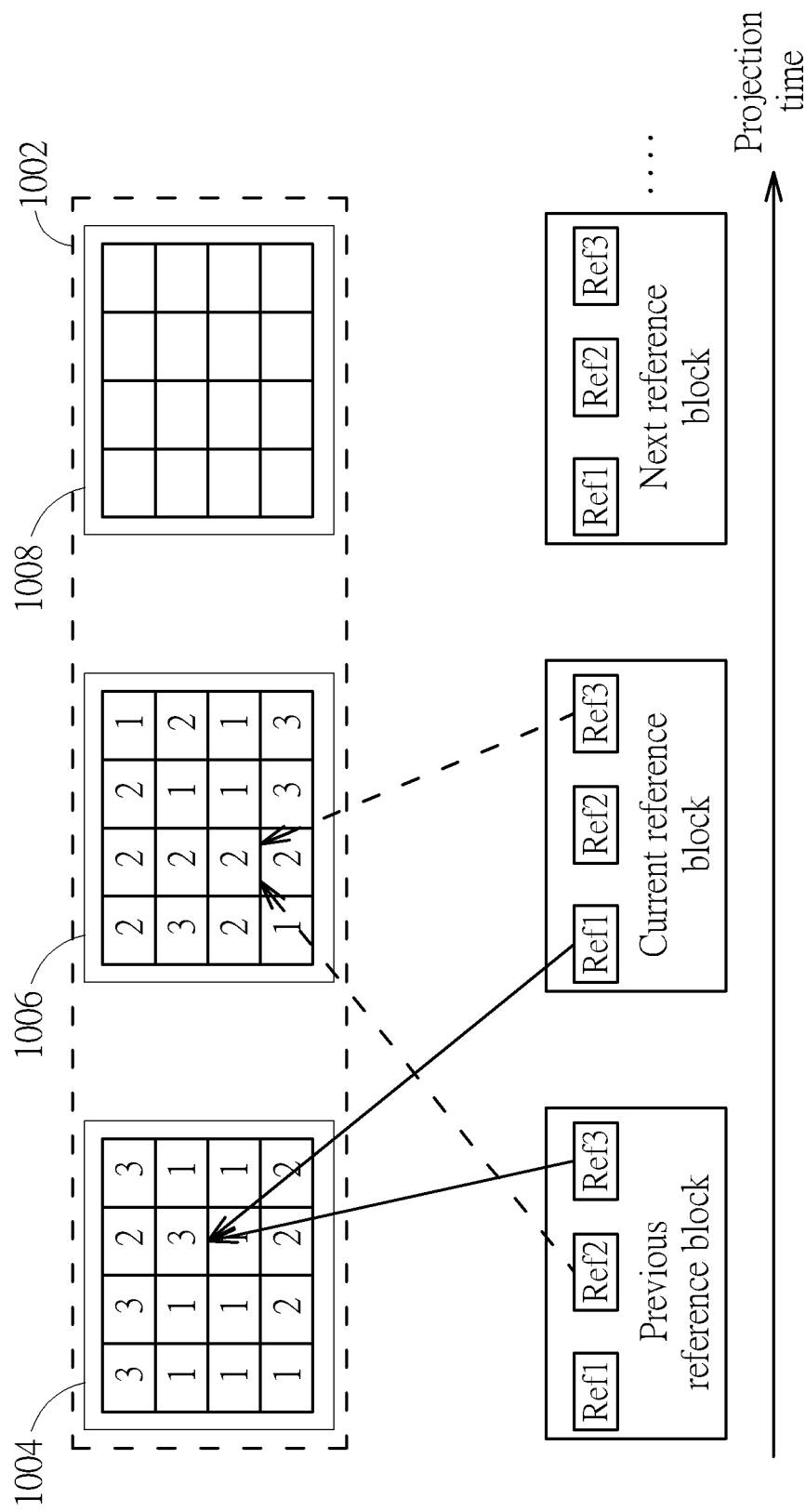
FIG. 10 is a diagram illustrating a block-level motion vector projection operation with the use of a priory table according to an embodiment of the present invention.

FIG. 10 is a diagram illustrating a block-level motion vector projection operation with the use of a priory table according to an embodiment of the present invention. The embodiment of FIG. 6 may be modified to include a priory table 1002. The processing circuit 402 is further arranged to build the priory table 1002 in its internal storage, where the priory table 1002 records table values for different 8×8 block positions in 64×64 blocks. For example, the priory table 1002 may only record table values for different 8×8 block positions in three successive 64×64 blocks of a current frame in a raster scan order. In this embodiment, when the block-level MV projection is applied to current 64×64 reference blocks co-located in different reference frames, the priority table 1002 built and maintained by the processing circuit 402 has a sub-table 1004 which records table values for MFMVs that are projected at 8×8 block positions included in a left neighbor of a current 64×64 block in the current frame and stored into the storage area 902 of the MFMV buffer 404, a sub-table 1006 which records table values for MFMVs that are projected at 8×8 block positions included in the current 64×64 block of the current frame and stored into the storage area 904, a sub-table 1008 which records table values for MFMVs that are projected at 8×8 block positions included in a right neighbor of the current 64×64 block in the current frame and stored into the storage area 906. Specifically, when an MFMV of one 8×8 block that is derived from MV projection of a reference frame and stored into the MFMV buffer 404, an associated table value for the 8×8 block position is set by a frame index of the reference frame. Each table value maintained in the priority table 1002 is referenced to judge whether overlapping/overwriting an MFMV stored in the MFMV buffer 404 is allowable. For example, the processing circuit 402 applies MV projection to MVs possessed by a first 64×64 reference block in a first reference frame to generate a first MV projection result, wherein the first 64×64 reference block in the first reference frame and a first 64×64 block in a current frame are co-located blocks, and the first MV projection result includes a first MFMV at a projected 8×8 block position in the current frame. Next, the processing circuit 402 stores the first MFMV into the MFMV buffer 404, and sets a table value of the priority table 1002 by a frame index of the first reference frame. After the first MV projection result is generated, the processing circuit 402 apples MV projection to MVs possessed by a second 64×64 reference block in a second reference frame to generate a second MV projection result, wherein the second 64×64 reference block in the second reference frame and a second 64×64 block in the current frame are co-located blocks, the first 64×64 block and the second 64×64 block are located at the same block row, and the second MV projection result includes a second MFMV at the same projected 8×8 block position in the current frame. Next, the processing circuit 402 compares the recorded table value of the priority table 1002 with a frame index of the second reference frame for determining whether to store the second MFMV into the MFMV buffer 404 to overwrite the first MFMV stored in the MFMV buffer 404.

As illustrated in FIG. 10, a projection result of MV projection applied to the previous reference block in the third reference frame Ref3 has a first MFMV at a projected 8×8 block position in a left neighbor. Suppose that the first MFMV is allowed to be stored into the MFMV buffer 404. An associated table value in the sub-table 1004 is set by the frame index "3" of the third reference frame Ref3. A projection result of MV projection applied to the current reference block in the first reference frame Ref1 has a second MFMV at the same projected 8×8 block position in the left neighbor. Since the associated table value is set by the frame index "3" that is larger than a frame index "1" of the first reference frame Ref1, the first MFMV buffered in the storage area 902 of the MFMV buffer 404 is blocked from being overlapped/overwritten by the second MFMV. In this way, the wrong overlapping/overwriting is avoided by using the priority table 1002.

As further illustrated in FIG. 10, a projection result of MV projection applied to the previous reference block in the second reference frame Ref2 has a third MFMV at a projected 8×8 block position in a current 64×64 block of the current frame. Suppose that the third MFMV is allowed to be stored into the MFMV buffer 404. An associated table value in the sub-table 1006 is set by the frame index "2" of the second reference frame Ref2. A projection result of MV projection applied to the current reference block in the third reference frame Ref2 has a fourth MFMV at the same projected 8×8 block position in the current 64×64 block of the current frame. Since the associated table value is set by the frame index "2" that is smaller than a frame index "3" of the third reference frame Ref3, the third MFMV buffered in the storage area 904 of the MFMV buffer 404 is changed to the fourth MFMV.

Figure 11:
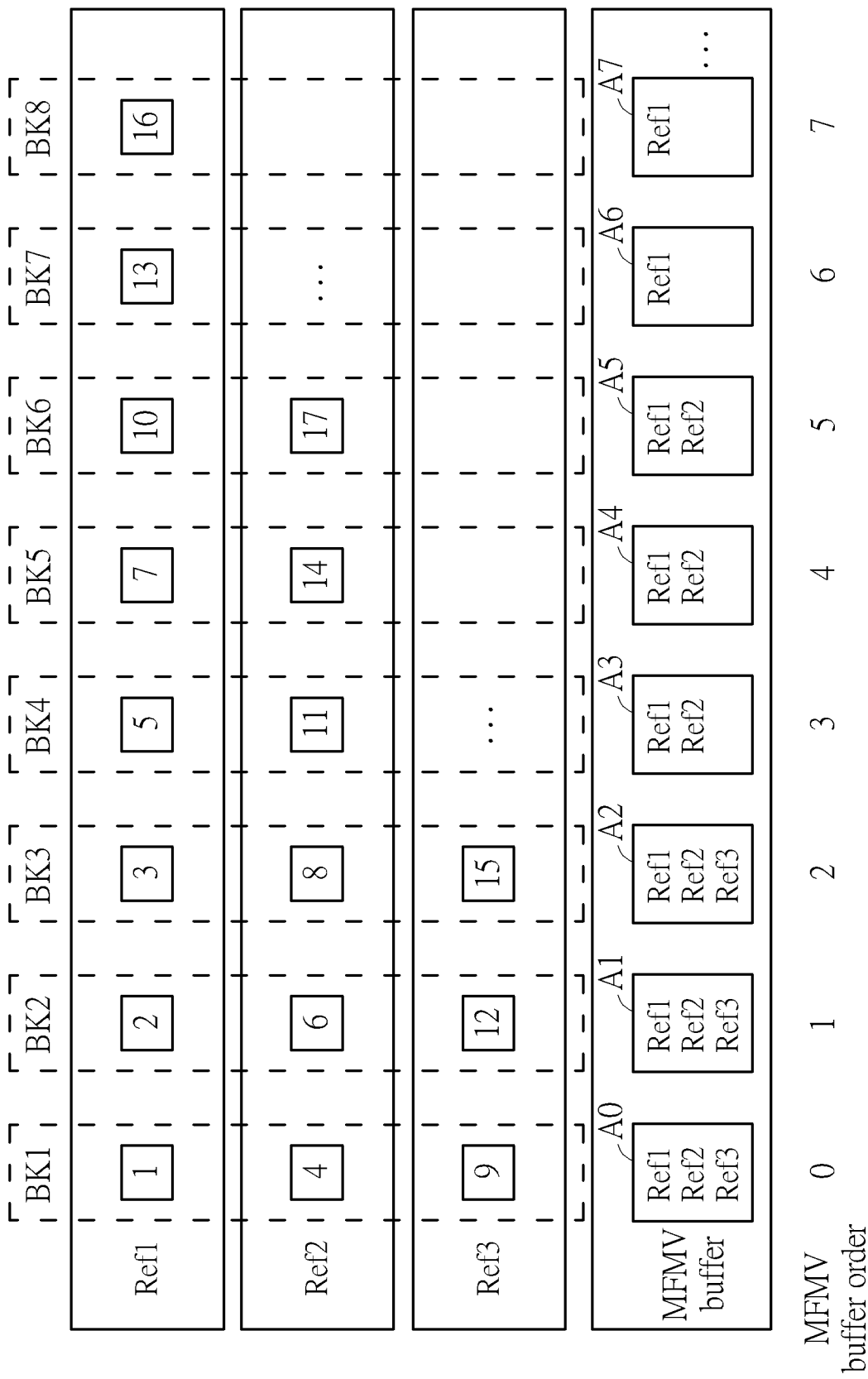
FIG. 11 is a diagram illustrating a block-level motion vector projection operation which ensures motion vector projection progress of one reference frame leads that of another reference frame by K 64×64 reference blocks (K≥2) according to an embodiment of the present invention.

FIG. 11 is a diagram illustrating a block-level motion vector projection operation which ensures MV projection progress of one reference frame leads that of another reference frame by K 64×64 reference blocks (K≥2) according to an embodiment of the present invention. The embodiment of FIG. 6 may be modified to adopt a concept of leading blocks for avoiding wrong overlapping/overwriting. The MV projection order of 64×64 reference blocks in three reference frames Ref1, Ref2, and Ref3 is represented by reference numerals in an ascending order 1→2→3→ . . . →16→17. Hence, the MV projection applied to MVs of the first 64×64 reference block BK1 in the second reference frame Ref2 is not started until MV projection applied to MVs of 64×64 reference blocks BK1-BK3 in the first reference frame Ref1 is done; and the MV projection applied to MVs of the first 64×64 reference block BK1 in the third reference frame Ref3 is not started until MV projection applied to MVs of 64×64 reference blocks BK1-BK5 in the first reference frame Ref1 and MV projection applied to MVs of 64×64 reference blocks BK1-BK3 in the second reference frame Ref2 is done. Specifically, the processing circuit 402 applies MV projection to MVs possessed by an $M^{th}$ reference block in a first selected reference frame (e.g., one of Ref1 and Ref2), wherein the $M^{th}$ reference blocks in the first selected reference frame and an $M^{th}$ block of a block row in the current frame are co-located blocks. After MV projection applied to the $M^{th}$ reference block in the first selected reference frame is done, the processing circuit 402 applies MV projection to MVs possessed by an $N^{th}$ reference block in a second selected reference frame (e.g., one of Ref2 and Ref3) different from the first selected reference frame, wherein the $N^{th}$ reference block in the second selected reference frame and an $N^{th}$ block of the block row in the current frame are co-located blocks. In accordance with the concept of leading blocks, M and N are positive integers, M is larger than N, and any block of the block row is the $M^{th}$ block except left-most (M-N) blocks of the block row. For example, a value of (M-N) is equal to or larger than 2, depending upon actual design considerations.

As mentioned above, when MV projection is applied to MVs of a 64×64 reference block in a reference frame, the valid range is defined by a co-located 64×64 block in a current frame, a left neighbor of the co-located 64×64 block in the current frame, and a right neighbor of the co-located 64×64 block in the current frame. When MV projection is applied to 64×64 reference blocks BK1 co-located in different reference frames Ref1-Ref3, the storage areas A0 and A1 are accessed for MFMV storage. When MV projection is applied to 64×64 reference blocks BK2 co-located in different reference frames Ref1-Ref3, the storage areas A0, A1 and A2 are accessed for MFMV storage. When MV projection is applied to 64×64 reference blocks BK3 co-located in different reference frames Ref1-Ref3, the storage areas A1, A2 and A3 are accessed for MFMV storage. When MV projection is applied to 64×64 reference blocks BK4 co-located in different reference frames Ref1-Ref3, the storage areas A2, A3 and A4 are accessed for MFMV storage. When MV projection is applied to 64×64 reference blocks BK5 co-located in different reference frames Ref1-Ref3, the storage areas A3, A4 and A5 are accessed for MFMV storage. When MV projection is applied to 64×64 reference blocks BK6 co-located in different reference frames Ref1-Ref3, the storage areas A4, A5 and A6 are accessed for MFMV storage. When MV projection is applied to 64×64 reference blocks BK7 in different reference frames Ref1-Ref3, the storage areas A5, A6 and A7 are accessed for MFMV storage.

As shown in FIG. 11, when MV projection is currently applied to MVs possessed by the 64×64 reference block BK3 in the third reference frame Ref3, the storage areas A1, A2 and A3 may be accessed for buffering a projection result generated from the 64×64 reference block BK3 in the third reference frame Ref3. Since MV projection applied to MVs possessed by the 64×64 reference blocks BK1-BK5 in the first reference frame Ref1 is already done, and MV projection applied to MVs possessed by the 64×64 reference blocks BK1-BK5 in the second reference frame Ref2 is already done, any projected MV that is generated from MV projection of the 64×64 reference block BK3 in the third reference frame Ref3 and stored in the MFMV buffer 404 is not overwritten by a projected MV derived from MV projection of 64×64 reference blocks BK1-BK5 included in any of the first reference frame Ref1 and the second reference frame Ref2. In this way, the wrong overlapping/overwriting is avoided by ensuring that MV projection progress of one reference frame leads that of another reference frame by two or more 64×64 reference blocks.

As shown in FIG. 11, when MV projection is currently applied to MVs possessed by the 64×64 reference block BK6 in the second reference frame Ref2, the storage areas A4, A5 and A6 may be accessed for buffering a projection result generated from the 64×64 reference block BK6 in the second reference frame Ref2. Since MV projection applied to MVs possessed by the 64×64 reference blocks BK4-BK8 in the first reference frame Ref1 is already done, any projected MV that is generated from MV projection of the 64×64 reference block BK6 in the second reference frame Ref2 and stored in the MFMV buffer 404 is not overwritten by a projected MV generated from MV projection of 64×64 reference blocks BK4-BK8 included in the first reference frame Ref1. In this way, the wrong overlapping/overwriting is avoided by ensuring that MV projection progress of one reference frame leads that of another reference frame by two or more 64×64 reference blocks.

Figure 12:
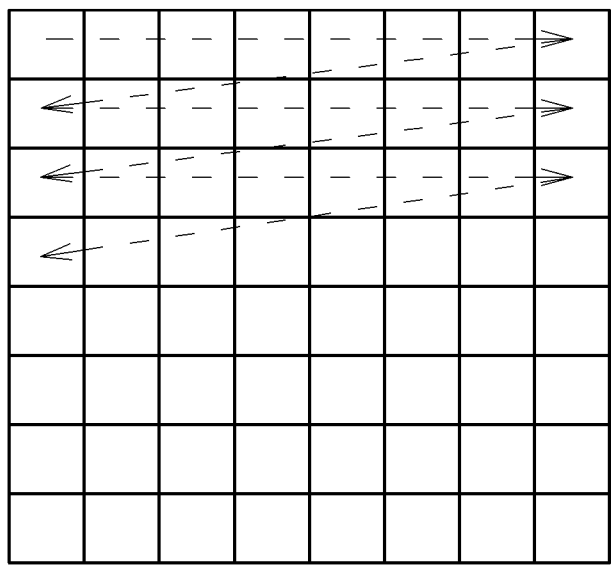
FIG. 12 is a diagram illustrating a scanning order for a super block size of 64×64 according to an embodiment of the present invention.
Figure 13:
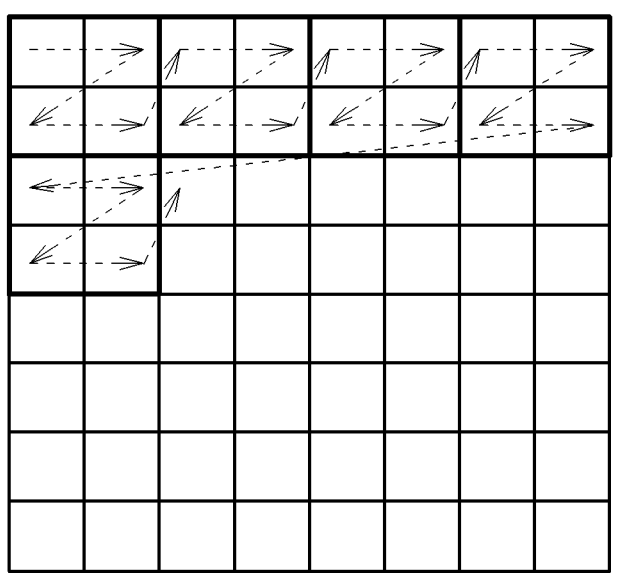
FIG. 13 is a diagram illustrating a scanning order for a super block size of 128×128 according to an embodiment of the present invention.

One frame may be divided into a plurality of super blocks (SBs). For example, each SB may be a block or multiple blocks for AV1/VP9. For another example, each SB may be a largest coding unit (LCU) or multiple LCUs for High Efficiency Video Coding (HEVC). The MV projection order is set by a scanning order of 64×64 blocks. However, the scanning order for one SB size may be different from the scanning order for a different SB size. This also indicates that the processes of storing MFMVs into an MFMV buffer are not the same. FIG. 12 is a diagram illustrating a scanning order for a SB size of 64×64 according to an embodiment of the present invention. Since one SB is one 64×64 block, the 64×64 blocks in the same frame are accessed in a raster scan order (which is also the MV projection order). The MV projection order is indicated by the arrow symbol shown in FIG. 12. FIG. 13 is a diagram illustrating a scanning order for a SB size of 128×128 according to an embodiment of the present invention. Since one SB includes four 64×64 blocks, the SBs in the same frame are accessed in a raster scan order, and the 64×64 blocks in the same SB are accessed in a raster scan order. The MV projection order is indicated by the arrow symbol shown in FIG. 13.

Since the process of storing MFMVs into an MFMV buffer under an SB size of 128×128 is different from the process of storing MFMVs into an MFMV buffer under an SB size of 64×64, using an MFMV buffer having a single storage space to deal with the storage process for SB size of 128×128 may require a complex hardware design.

Figure 14:
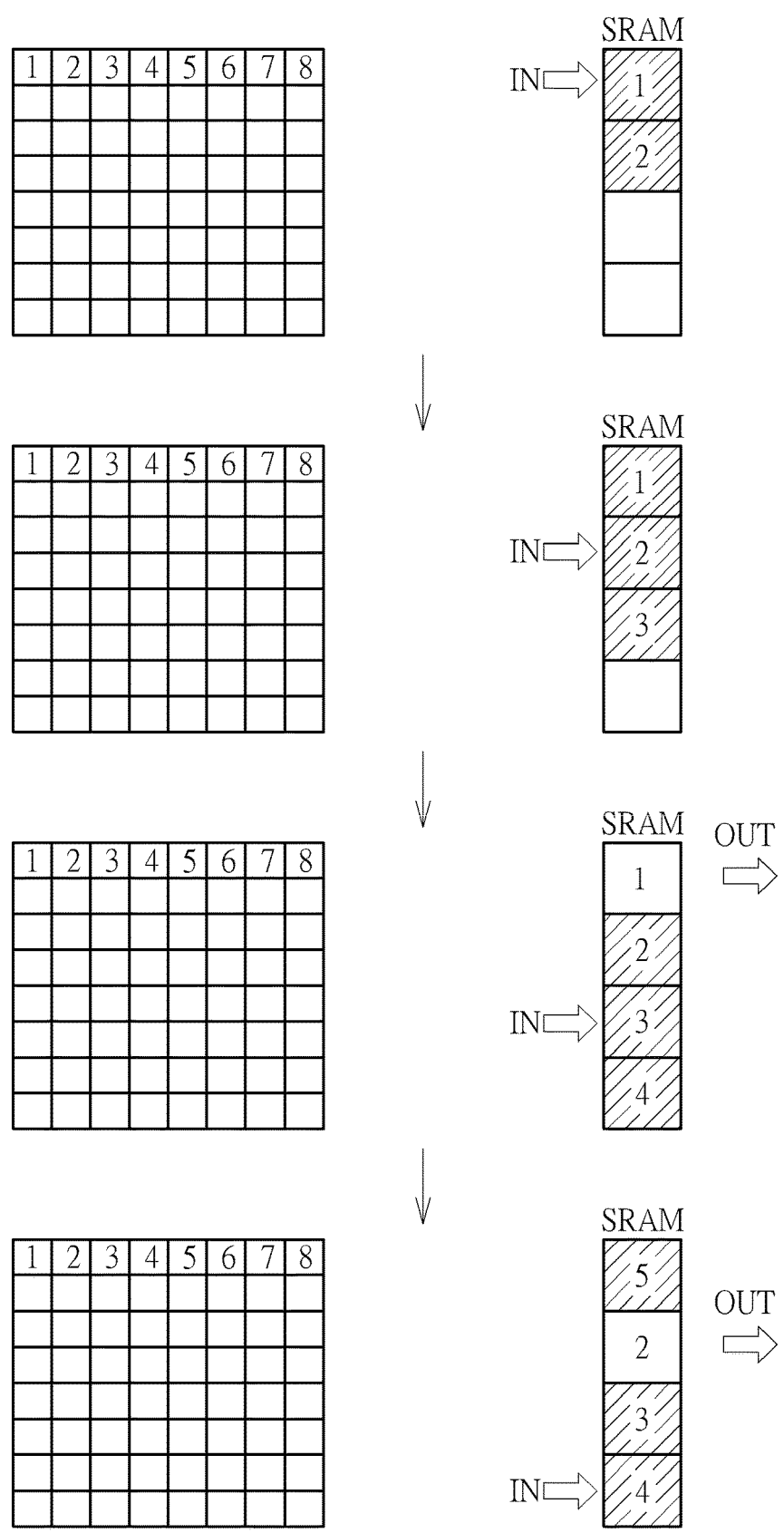
FIG. 14 is a diagram illustrating a motion field motion vector buffer design which uses a single storage space to deal with a storage process for super block size of 64×64 according to an embodiment of the present invention.

FIG. 14 is a diagram illustrating an MFMV buffer design which uses a single storage space to deal with a storage process for SB size of 64×64 according to an embodiment of the present invention. An MFMV buffer may be implemented by an SRAM with a single storage space defined by continuous memory addresses. The MV projection order shown in FIG. 12 may be employed.

When MV projection is applied to a 64×64 reference block with a block index "1", a storage area with a storage index "1" is allocated in the MFMV buffer 440 for storing projected MVs at 8×8 block positions in a current 64×64 block, and a storage area with a storage index "2" is allocated in the MFMV buffer 440 for storing projected MVs at 8×8 block positions in a right neighbor.

When MV projection is applied to a 64×64 reference block with a block index "2", the storage area with the storage index "1" is used for storing projected MVs at 8×8 block positions in a left neighbor, the storage area with the storage index "2" is used for storing projected MVs at 8×8 block positions in a current 64×64 block, and a storage area with a storage index "3" is allocated in the MFMV buffer 440 for storing projected MVs at 8×8 block positions in a right neighbor.

When MV projection is applied to a 64×64 reference block with a block index "3", the storage area with the storage index "2" is used for storing projected MVs at 8×8 block positions in a left neighbor, the storage area with the storage index "3" is used for storing projected MVs at 8×8 block positions in a current 64×64 block, and a storage area with a storage index "4" is allocated in the MFMV buffer 440 for storing projected MVs at 8×8 block positions in a right neighbor. In addition, MFMVs stored in the storage area with the storage index "1" can be read out for following MV processing (e.g., MVP determination and MV determination).

When MV projection is applied to a 64×64 reference block with a block index "4", the storage area with the storage index "3" is used for storing projected MVs at 8×8 block positions in a left neighbor, the storage area with the storage index "4" is used for storing projected MVs at 8×8 block positions in a current 64×64 block, and a storage area with a storage index "5" is derived from releasing and reusing the original storage area with the storage index "1" and is used for storing projected MVs at 8×8 block positions in a right neighbor. In addition, MFMVs stored in the storage area with the storage index "2" can be read out for following MV processing (e.g., MVP determination and MV determination).

Figure 15:
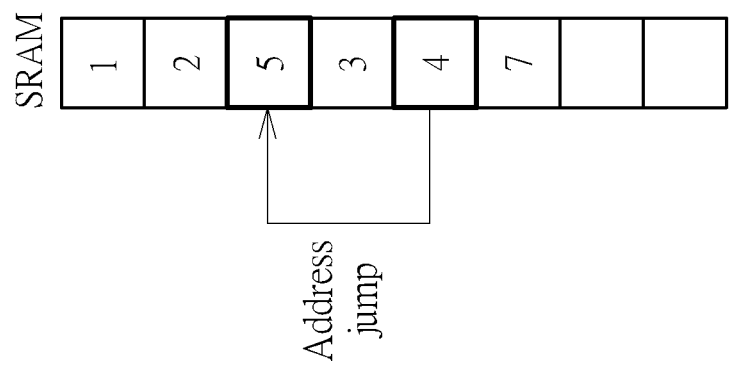
FIG. 15 is a diagram illustrating a motion field motion vector buffer design which uses a single storage space to deal with a storage process for super block size of 128×128 according to an embodiment of the present invention.
Figure 15:
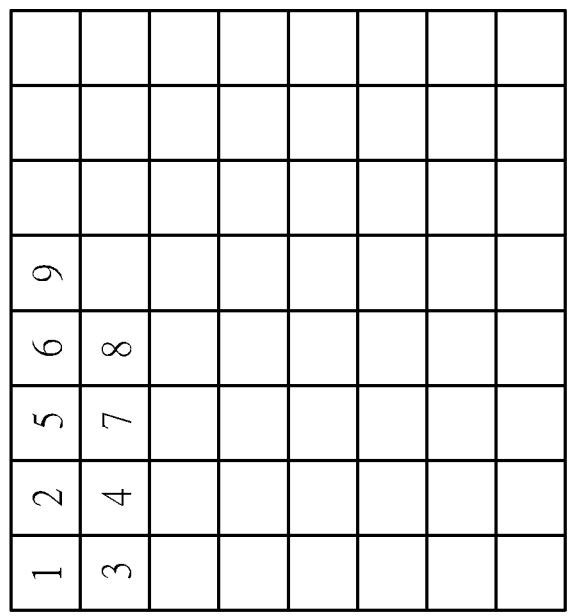

FIG. 15 is a diagram illustrating an MFMV buffer design which uses a single storage space to deal with a storage process for SB size of 128×128 according to an embodiment of the present invention. An MFMV buffer may be implemented by an SRAM with a single storage space defined by continuous memory addresses. The MV projection order shown in FIG. 13 may be employed.

When MV projection is applied to a 64×64 reference block with a block index "1", a storage area with a storage index "1" is allocated in the MFMV buffer 440 for storing projected MVs at 8×8 block positions in a current 64×64 block, and a storage area with a storage index "2" is allocated in the MFMV buffer 440 for storing projected MVs at 8×8 block positions in a right neighbor.

When MV projection is applied to a 64×64 reference block with a block index "2", the storage area with the storage index "1" is used for storing projected MVs at 8×8 block positions in a left neighbor, the storage area with the storage index "2" is used for storing projected MVs at 8×8 block positions in a current 64×64 block, and a storage area with a storage index "5" is allocated in the MFMV buffer 440 for storing projected MVs at 8×8 block positions in a right neighbor.

When MV projection is applied to a 64×64 reference block with a block index "3", a storage area with a storage index "3" is allocated in the MFMV buffer 440 for storing projected MVs at 8×8 block positions in a current 64×64 block, and a storage area with a storage index "4" is allocated in the MFMV buffer 440 for storing projected MVs at 8×8 block positions in a right neighbor.

When MV projection is applied to a 64×64 reference block with a block index "4", the storage area with the storage index "3" is used for storing projected MVs at 8×8 block positions in a left neighbor, the storage area with the storage index "4" is used for storing projected MVs at 8×8 block positions in a current 64×64 block, and a storage area with a storage index "7" is allocated in the MFMV buffer 440 for storing projected MVs at 8×8 block positions in a right neighbor.

When MV projection is applied to a 64×64 reference block with a block index "5", an address jump back control is needed to perform the storage process due to the fact that the storage areas are allocated in continuous memory addresses of the single storage space and an end address of the storage area with the storage index "4" is not followed by a start address of the storage area with the storage index "5". However, the address jump back control is complex for the hardware design. To address this issue, the present invention proposes implementing an MFMV buffer with two storage spaces.

Figure 16:
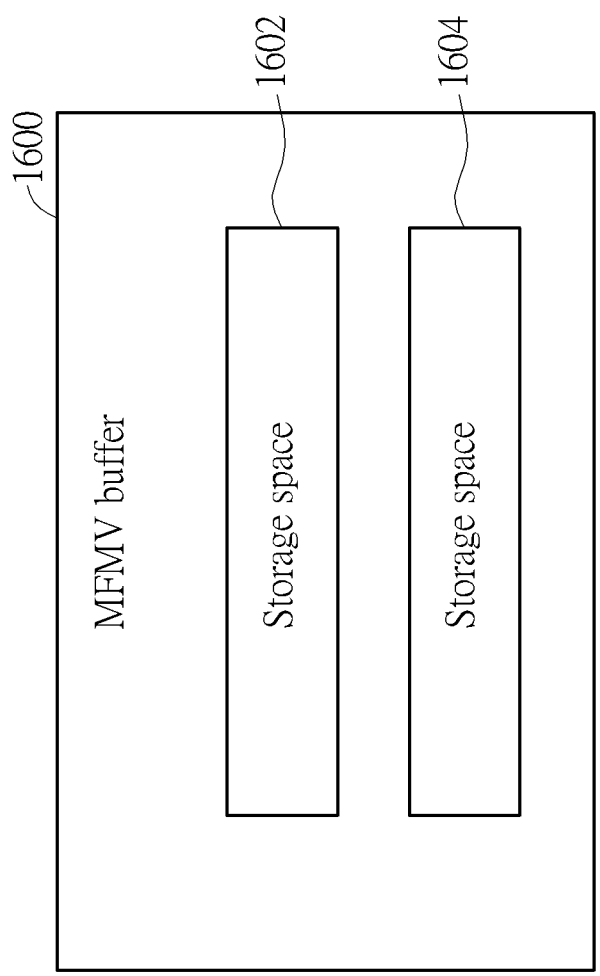
FIG. 16 is a diagram illustrating a motion field motion vector buffer according to an embodiment of the present invention.

FIG. 16 is a diagram illustrating an MFMV buffer according to an embodiment of the present invention. When the SB size is set by 128×128, the MFMV buffer 440 shown in FIG. 1 may be implemented by the MFMV buffer 1600 shown in FIG. 16. The MFMV buffer 1600 includes two storage spaces 1602 and 1604. A current frame is divided into odd-numbered block rows each consisting of 64×64 blocks, and even-numbered block rows each consisting of 64×64 blocks. The MFMV storage process for SB size of 128×128 is separated into two storage processes, one for odd-numbered block rows and the other for even-numbered block rows. The MFMV storage process for SB size of 128×128 may be regarded as two storage processes each for SB size of 64×64. Under a condition that the SB size is set by 128×128, the processing circuit 402 stores MFMVs generated for each 64×64 block located at the odd-numbered block rows of the current frame into the storage space 1602 only, and stores MFMVs generated for each 64×64 block located at the even-numbered block rows of the current frame into the storage space 1604 only.

Figure 17:
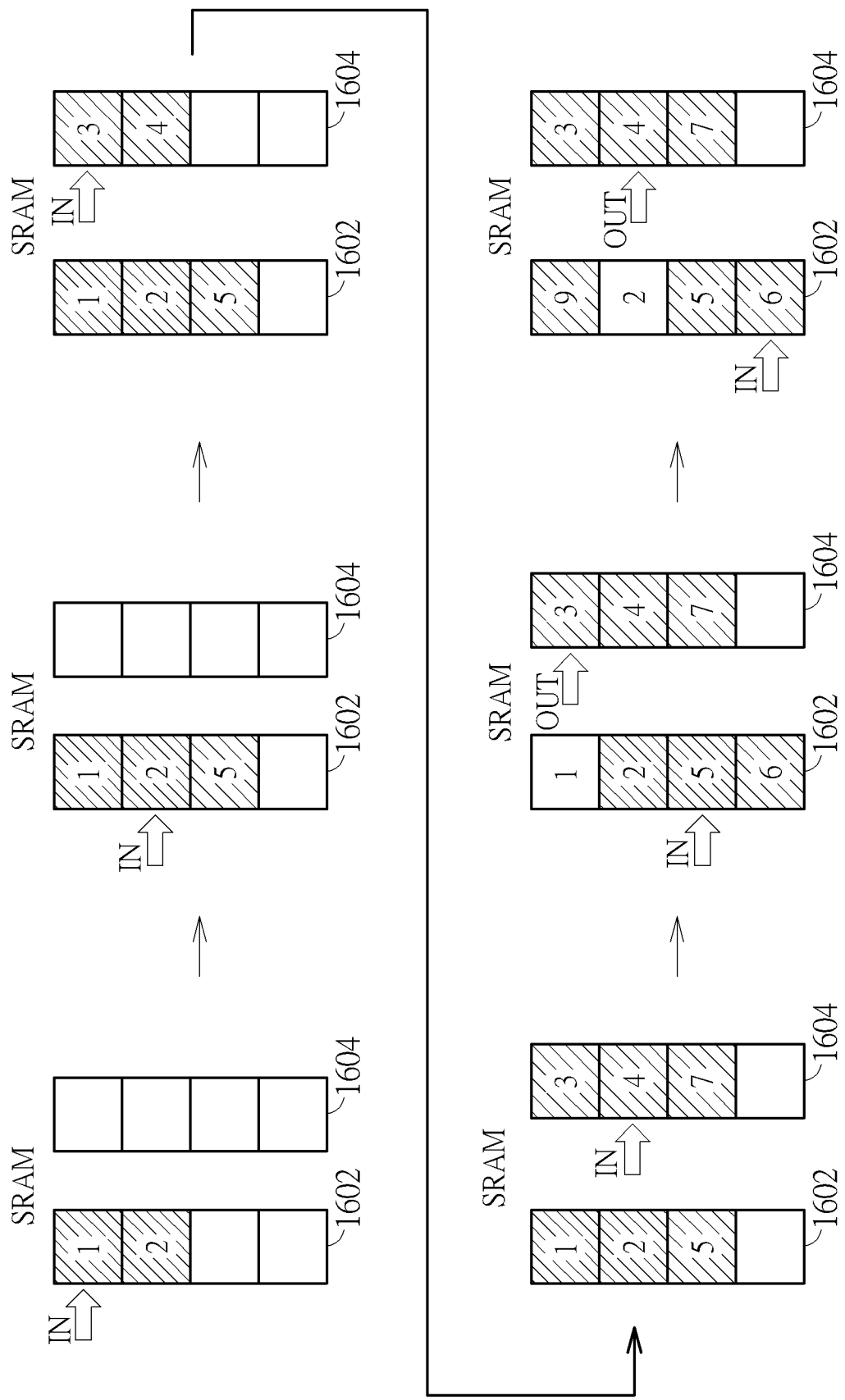
FIG. 17 is a diagram illustrating a motion field motion vector buffer design which uses two storage spaces to deal with a storage process for super block size of 128×128 according to an embodiment of the present invention.

Please refer to FIG. 15 in conjunction with FIG. 17. FIG. 17 is a diagram illustrating an MFMV buffer design which uses two storage spaces to deal with a storage process for SB size of 128×128 according to an embodiment of the present invention. The MFMV buffer 1600 may be implemented by an SRAM with two storage spaces 1602 and 1604 each defined by continuous memory addresses. The MV projection order shown in FIG. 15 may be employed.

When MV projection is applied to a 64×64 reference block with a block index "1", a storage area with a storage index "1" is allocated in the storage space 1602 for storing projected MVs at 8×8 block positions in a current 64×64 block, and a storage area with a storage index "2" is allocated in the storage space 1604 for storing projected MVs at 8×8 block positions in a right neighbor.

When MV projection is applied to a 64×64 reference block with a block index "2", the storage area with the storage index "1" is used for storing projected MVs at 8×8 block positions in a left neighbor, the storage area with the storage index "2" is used for storing projected MVs at 8×8 block positions in a current 64×64 block, and a storage area with a storage index "5" is allocated in the storage space 1602 for storing projected MVs at 8×8 block positions in a right neighbor.

When MV projection is applied to a 64×64 reference block with a block index "3", a storage area with a storage index "3" is allocated in the storage space 1604 for storing projected MVs at 8×8 block positions in a current 64×64 block, and a storage area with a storage index "4" is allocated in the storage space 1604 for storing projected MVs at 8×8 block positions in a right neighbor When MV projection is applied to a 64×64 reference block with a block index "4", the storage area with a storage index "3" is used for storing projected MVs at 8×8 block positions in a left neighbor, the storage area with the storage index "4" is used for storing projected MVs at 8×8 block positions in a current 64×64 block, and a storage area with a storage index "7" is allocated in the storage space 1604 for storing projected MVs at 8×8 block positions in a right neighbor.

When MV projection is applied to a 64×64 reference block with a block index "5", the storage area with the storage index "2" is used for storing projected MVs at 8×8 block positions in a left neighbor, the storage area with the storage index "5" is used for storing projected MVs at 8×8 block positions in a current 64×64 block, and a storage area with a storage index "6" is allocated in the storage space 1602 for storing projected MVs at 8×8 block positions in a right neighbor. Since the storage area with the storage index "4" and the storage area with the storage index "5" are allocated in separate storage spaces, no address jump back control for one storage space in which storage areas are allocated in continuous memory addresses is needed. In addition, MFMVs stored in the storage area with the storage index "1" can be read out from the storage space 1602 for following MV processing (e.g., MVP determination and MV determination).

When MV projection is applied to a 64×64 reference block with a block index "6", the storage area with the storage index "5" is used for storing projected MVs at 8×8 block positions in a left neighbor, the storage area with the storage index "6" is used for storing projected MVs at 8×8 block positions in a current 64×64 block, and a storage area with a storage index "9" is derived from releasing and reusing the original storage area with the storage index "1" and is used for storing projected MVs at 8×8 block positions in a right neighbor. In addition, MFMVs stored in the storage area with the storage index "2" can be read out for following MV processing (e.g., MVP determination and MV determination).

As can be seen from FIG. 17, storage areas allocated in continuous memory addresses of one storage space 1602/1604 are accessed without the need of address jump back control. In this way, the hardware design of the processing circuit 402 can be simplified.

In above embodiments, the proposed on-the-fly MV projection scheme and the associated improvement techniques (e.g., priority table and leading blocks) are employed by a video decoder. However, this is for illustrative purposes only, and is not meant to be a limitation of the present invention. In practice, the proposed on-the-fly MV projection scheme and the associated improvement techniques (e.g., priority table and leading blocks) may also be employed by a video encoder.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion vector (MV) projection method comprising:
generating motion field motion vectors (MFMVs) for a first portion of a current frame by applying MV projection to MVs of a portion of each of reference frames, and storing the MFMVs of the first portion of the current frame into an MFMV buffer; and
generating MFMVs for a second portion of the current frame by applying MV projection to MVs of a portion of each of the reference frames, and storing the MFMVs of the second portion of the current frame into the MFMV buffer;
wherein the second portion of the current frame does not overlap the first portion of the current frame; and before generating the MFMVs for the second portion of the current frame is done, at least one of the MFMVs of the first portion of the current frame is read from the MFMV buffer and involved in motion vector determination of at least one coding block included in the first portion of the current frame; and wherein the first portion of the current frame comprises a first block and a second block located at a same block row, the reference frames comprise a first reference frame and a second reference frame, and generating the MFMVs for the first portion of the current frame comprises:

applying MV projection to MVs possessed by a first reference block in the first reference frame to generate a first MV projection result, wherein the first reference block in the first reference frame and the first block in the current frame are co-located blocks, and the first MV projection result includes a first MFMV at a projected block position in the current frame;

storing the first MFMV into the MFMV buffer, and setting a table value of a priority table by a frame index of the first reference frame;

after the first MV projection result is generated, applying MV projection to MVs possessed by a second reference block in the second reference frame to generate a second MV projection result, wherein the second reference block in the second reference frame and the second block in the current frame are co-located blocks, and the second MV projection result includes a second MFMV at the projected block position in the current frame; and comparing the table value of the priority table with a frame index of the second reference frame for determining whether to store the second MFMV into the MFMV buffer to overwrite the first MFMV stored in the MFMV buffer.

2. The MV projection method of claim 1, wherein the second portion of the current frame comprises a block located at a right-most block column and a bottom-most block row of the current frame.

3. The MV projection method of claim 1, wherein generating the MFMVs for the first portion of the current frame comprises:

applying MV projection to MVs possessed by the first reference block in each of the reference frames to generate one MV projection result for the current frame, and updating the MFMV buffer according to MV projection results that are generated from first reference blocks in the reference frames, respectively, wherein the first reference blocks in the reference frames and the first block in the current frame are co-located blocks; and after the MV projection results for the first reference blocks in the reference frames are generated, applying MV projection to MVs possessed by the second reference block in each of the reference frames to generate one MV projection result for the current frame, and updating the MFMV buffer according to MV projection results that are generated from second reference blocks in the reference frames, respectively, wherein the second reference blocks in the reference frames and the second block in the current frame are co-located blocks.

4. The MV projection method of claim 1, wherein the first portion of the current frame comprises blocks, and generating the MFMVs for the first portion of the current frame comprises:

applying MV projection to MVs possessed by first reference blocks in the first reference frame to generate first MV projection results for the current frame, and updating the MFMV buffer according to the first MV projection results that are generated from the first reference blocks, respectively, wherein the first reference blocks in the first reference frame and the blocks in the current frame are co-located blocks, respectively;

after the first MV projection results are generated, applying MV projection to MVs possessed by second reference blocks in the second reference frame to generate second MV projection results, and updating the MFMV buffer according to the second MV projection results that are generated from the second reference blocks, respectively, wherein the second reference blocks in the second reference frame and the blocks in the current frame are co-located blocks, respectively.

5. The MV projection method of claim 1, wherein the current frame comprises odd-numbered block rows and even-numbered block rows, the MFMV buffer comprises a first storage space and a second storage space, and the motion vector projection method further comprises:

storing MFMVs of each block located at the odd-numbered block rows of the current frame into the first storage space only; and storing MFMVs of each block located at the even-numbered block rows of the current frame into the second storage space only;

wherein the current frame is divided into a plurality of super blocks, each having a super block size larger than a size of said each block located at the odd-numbered block rows and larger than a size of said each block located at the even-numbered block rows.

6. A motion vector (MV) projection apparatus comprising:

a motion field motion vector (MFMV) buffer; and a processing circuit, arranged to:

generate MFMVs for a first portion of a current frame by applying MV projection to MVs of a portion of each of reference frames, and store the MFMVs of the first portion of the current frame into the MFMV buffer; and generate MFMVs for a second portion of the current frame by applying MV projection to MVs of a portion of each of the reference frames, and store the MFMVs of the second portion of the current frame into the MFMV buffer;

wherein the second portion of the current frame does not overlap the first portion of the current frame; and before the MFMVs for the second portion of the current frame are generated by the processing circuit, at least one of the MFMVs of the first portion of the current frame is read from the MFMV buffer and involved in motion vector determination of at least one coding block included in the first portion of the current frame; and wherein the first portion of the current frame comprises a first block and a second block located at a same block row, the reference frames comprise a first reference frame and a second reference frame, and the processing circuit generates the MFMVs for the first portion of the current frame by:

applying MV projection to MVs possessed by a first reference block in the first reference frame to generate a first MV projection result, wherein the first reference block in the first reference frame and the first block in the current frame are co-located blocks, and the first MV projection result includes a first MFMV at a projected block position in the current frame;

storing the first MFMV into the MFMV buffer, and setting a table value of a priority table by a frame index of the first reference frame;

after the first MV projection result is generated, applying MV projection to MVs possessed by a second reference block in the second reference frame to generate a second MV projection result, wherein the second reference block in the second reference frame and the second block in the current frame are co-located blocks, and the second MV projection result includes a second MFMV at the projected block position in the current frame; and comparing the table value of the priority table with a frame index of the second reference frame for determining whether to store the second MFMV into the MFMV buffer to overwrite the first MFMV stored in the MFMV buffer.

7. The MV projection apparatus of claim 6, wherein the second portion of the current frame comprises a block located at a right-most block column and a bottom-most block row of the current frame.

8. The MV projection apparatus of claim 6, wherein the processing circuit generates the MFMVs for the first portion of the current frame by:

applying MV projection to MVs possessed by the first reference block in each of the reference frames to generate one MV projection result for the current frame, and updating the MFMV buffer according to MV projection results that are generated from first reference blocks in the reference frames, respectively, wherein the first reference blocks in the reference frames and the first block in the current frame are co-located blocks; and after the MV projection results for the first reference blocks in the reference frames are generated, applying MV projection to MVs possessed by the second reference block in each of the reference frames to generate one MV projection result for the current frame, and updating the MFMV buffer according to MV projection results that are generated from second reference blocks in the reference frames, respectively, wherein the second reference blocks in the reference frames and the second block in the current frame are co-located blocks.

9. The MV projection apparatus of claim 6, wherein the first portion of the current frame comprises blocks, and the processing circuit generates the MFMVs for the first portion of the current frame by:

applying MV projection to MVs possessed by first reference blocks in the first reference frame to generate first MV projection results for the current frame, and updating the MFMV buffer according to the first MV projection results that are generated from the first reference blocks, respectively, wherein the first reference blocks in the first reference frame and the blocks in the current frame are co-located blocks, respectively;

after the first MV projection results are generated, applying MV projection to MVs possessed by second reference blocks in the second reference frame to generate second MV projection results, and updating the MFMV buffer according to the second MV projection results that are generated from the second reference blocks, respectively, wherein the second reference blocks in the second reference frame and the blocks in the current frame are co-located blocks, respectively.

10. The MV projection apparatus of claim 6, wherein the current frame comprises odd-numbered block rows and even-numbered block rows; the MFMV buffer comprises a first storage space and a second storage space; the processing circuit is further arranged to store MFMVs of each block located at the odd-numbered block rows of the current frame into the first storage space only, and store MFMVs of each block located at the even-numbered block rows of the current frame into the second storage space only; and the current frame is divided into a plurality of super blocks, each having a super block size larger than a size of said each block located at the odd-numbered block rows and larger than a size of said each block located at the even-numbered block rows.

* * * * *